US011207953B2

(12) United States Patent
Sakurai

(10) Patent No.: US 11,207,953 B2
(45) Date of Patent: Dec. 28, 2021

(54) VEHICLE INTERIOR STRUCTURES INCLUDING CURTAIN MEMBERS

(71) Applicant: Toyota Jidosha Kabushiki Kaisha, Toyota (JP)

(72) Inventor: Hideyuki Sakurai, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 135 days.

(21) Appl. No.: 16/589,536

(22) Filed: Oct. 1, 2019

(65) Prior Publication Data

US 2020/0108698 A1 Apr. 9, 2020

(30) Foreign Application Priority Data

Oct. 5, 2018 (JP) .............................. JP2018-190066

(51) Int. Cl.
*B60J 1/20* (2006.01)
*B60J 7/00* (2006.01)

(52) U.S. Cl.
CPC ........... *B60J 1/2063* (2013.01); *B60J 1/2019* (2013.01); *B60J 1/2036* (2013.01); *B60J 7/0015* (2013.01)

(58) Field of Classification Search
CPC ... B60R 21/06; B60R 21/08; B60R 2011/008; B60R 2011/0085; B60R 2011/0082; B60K 2370/771; B60K 2370/788; B60N 2/91; G03B 21/58
USPC .............................................. 296/24.4, 24.46
See application file for complete search history.

(56) References Cited

U.S. PATENT DOCUMENTS

| | | | | |
|---|---|---|---|---|
| 5,341,241 | A * | 8/1994 | Shopp ................. | E06B 9/17007 359/443 |
| 6,364,389 | B1 * | 4/2002 | Beigel ...................... | B60P 3/36 160/238 |
| 9,333,931 | B1 * | 5/2016 | Cheng ..................... | B60R 21/08 |
| 9,358,929 | B1 * | 6/2016 | Huebner ................ | B60R 11/02 |
| 10,046,685 | B1 * | 8/2018 | Bryant ..................... | E06B 9/42 |
| 10,241,387 | B1 * | 3/2019 | Kim ........................ | G03B 29/00 |
| 2008/0048424 | A1 * | 2/2008 | Hakansson ............. | B60R 21/08 280/749 |
| 2009/0268164 | A1 * | 10/2009 | Bowden ................. | G03B 21/58 353/13 |
| 2012/0268665 | A1 | 10/2012 | Yetukuri et al. | |

(Continued)

FOREIGN PATENT DOCUMENTS

CN 209240937 U * 8/2013
CN 106274723 A * 4/2017
(Continued)

*Primary Examiner* — D Glenn Dayoan
*Assistant Examiner* — Kevin P Weldon
(74) *Attorney, Agent, or Firm* — Dinsmore & Shohl LLP

(57) ABSTRACT

An interior structure includes a pillar garnish, a channel member, and a screen member. The pillar garnish is integral with a center pillar, and is formed with an opening facing a vehicle cabin and formed with a hollow housing section on the opposite side to the vehicle cabin. The channel member is provided so as to be capable of being housed in the housing section and capable of moving toward the vehicle cabin through the opening. The screen member is provided at the channel member so as to be housed in the housing section when in a non-deployed state and so as to be deployed in the vehicle cabin in a state in which the channel member has been moved into the vehicle cabin.

15 Claims, 22 Drawing Sheets

(56) References Cited

U.S. PATENT DOCUMENTS

| | | | |
|---|---|---|---|
| 2015/0094897 A1 | 4/2015 | Cuddihy et al. | |
| 2016/0101697 A1* | 4/2016 | Rawlinson | H04N 21/41422 |
| | | | 701/49 |
| 2016/0221525 A1* | 8/2016 | Weerappuli | B60R 21/08 |
| 2017/0217290 A1 | 8/2017 | Yoshizumi et al. | |
| 2018/0312082 A1* | 11/2018 | Lalague | B60N 2/91 |
| 2020/0070736 A1* | 3/2020 | Kim | B60K 35/00 |

FOREIGN PATENT DOCUMENTS

| | | |
|---|---|---|
| DE | 19939972 A1 | 3/2001 |
| DE | 202015102581 U1 | 9/2015 |
| DE | 102016100881 A1 | 8/2016 |
| EP | 2380784 A1 * | 4/2011 |
| FR | 2985480 A1 * | 1/2012 |
| FR | 3006284 A1 * | 6/2013 |
| JP | 2004224235 A | 8/2004 |

* cited by examiner

VEHICLE INTERIOR STRUCTURES INCLUDING CURTAIN MEMBERS

CROSS-REFERENCE TO RELATED APPLICATION

This application is based upon and claims the benefit of priority of the prior Japanese Patent Application No. 2018-190066, filed on Oct. 5, 2018, the entire content of which is incorporated herein by reference.

TECHNICAL FIELD

The present disclosure relates to a vehicle interior structure.

RELATED ART

A vehicle described in US Patent Application Laid Open No. 2015/0094897 (Patent Document 1) includes an interior structure in which a screen is lowered into a vehicle cabin when self-driving has been determined to be in progress.

In structures in which a housing section that houses a curtain member is provided in a state projecting into a vehicle cabin, as in the interior structure of Patent Document 1, part of a vehicle cabin interior space taken up by the housing section, which may well cause an occupant to experience a claustrophobic sensation. Namely, there is room for improvement in terms of suppressing a housing section that houses a curtain member used in the vehicle cabin interior from imparting a claustrophobic sensation to an occupant when the curtain member is in a non-deployed state.

SUMMARY

In consideration of the above circumstances, an object of the present disclosure is to obtain a vehicle interior structure in which a housing section that houses a curtain member used in a vehicle cabin interior can be suppressed from imparting a claustrophobic sensation to an occupant when the curtain member is in a non-deployed state.

A vehicle interior structure according to a first aspect includes a vehicle interior member that is integral with a roof or a pillar, that is formed with an opening facing a vehicle cabin, and that is formed with a hollow housing section on the opposite side to the vehicle cabin, a moving member that is provided so as to be capable of being housed in the housing section and capable of moving toward the vehicle cabin through the opening, and a curtain member that is provided at the moving member so as to be housed in the housing section when in a non-deployed state, and so as to be deployed in the vehicle cabin accompanying movement of the moving member into the vehicle cabin or so as to deployed in the vehicle cabin in a state in which the moving member has been moved into the vehicle cabin.

In the vehicle interior structure according to the first aspect, the moving member is moved toward the vehicle cabin through the opening. The curtain member is either deployed in the vehicle cabin accompanying movement of the moving member into the vehicle cabin or deployed in the vehicle cabin in a state in which the moving member has been moved into the vehicle cabin. Note that the housing section is formed on the opposite side to the vehicle cabin. Namely, since the housing section does not project into the vehicle cabin, the housing section that houses the curtain member which is used in the vehicle cabin interior can be suppressed from imparting a claustrophobic sensation to an occupant when the curtain member is in a non-deployed state.

A vehicle interior structure according to a second aspect further includes an opening-closing member that is provided further toward the vehicle cabin side of the housing section than the curtain member and that is capable of opening and closing at least a portion of the opening.

In the vehicle interior structure according to the second aspect, at least a portion of the opening is covered by the opening-closing member, enabling the moving member and the curtain member to be suppressed from being seen by an occupant.

A vehicle interior structure according to a third aspect further includes a drive section that drives the moving member toward the housing section and toward the vehicle cabin.

In the vehicle interior structure according to the third aspect, the drive section drives the moving member toward the housing section and toward the vehicle cabin. The movement direction of the moving member is thus less likely to waver than in a configuration in which an occupant holds and moves the moving member by hand, enabling the position of the moving member in the vehicle cabin to be stabilized.

In a vehicle interior structure according to a fourth aspect, the moving member includes an upper member that is moved from the housing section toward an upper side in the vehicle cabin, and a lower member that is moved from the housing section toward a lower side in the vehicle cabin, and the curtain member is provided in a non-deployed state to one of the upper member or the lower member.

In the vehicle interior structure according to the fourth aspect, the upper member is moved toward the upper side in the vehicle cabin, and the lower member is moved toward the lower side in the vehicle cabin such that the curtain member is exposed in the vehicle cabin interior in a non-deployed state. The exposed curtain member is then deployed toward the other of the upper member or the lower member so as to be stretched out between the upper member and the lower member. The other of the upper member or the lower member can be utilized to suppress positional misalignment of part of the curtain member. This enables swaying the curtain member when in a deployed state to be suppressed.

A vehicle interior structure according to a fifth aspect further includes a pull-urn section that pulls the curtain member from the one of the upper member or the lower member toward the other of the upper member or the lower member.

In the vehicle interior structure according to the fifth aspect, the pull-out section pulls the curtain member from the one of the upper member or the lower member toward the other of the upper member or the lower member and retains the curtain member in a stretched-out state, enabling flexing of the curtain member when in the deployed state to be suppressed.

In a vehicle interior structure according to a sixth aspect, the moving member includes an upper member that is moved from the housing section toward an upper side in the vehicle cabin, and a lower member that is moved from the housing section toward a lower side in the vehicle cabin, and the curtain member includes an upper curtain member provided at the upper member and a lower curtain member provided at the lower member.

In the vehicle interior structure according to the sixth aspect, the upper curtain member is disposed in the upper side of the vehicle cabin so as to divide an upper section of the vehicle cabin interior is divided into two spaces. The upper curtain member can easily be seen by the occupant. On the other hand, the lower curtain member is disposed in the lower side of the vehicle cabin so as to divide a lower section of the vehicle cabin interior into two spaces. The lower curtain member cannot easily be seen by the occupant. The upper curtain member is, for example, employed as a screen for viewing images. The lower curtain member is, for example, employed as a partitioning wall to partition a front seat from a rear seat. Namely, plural curtain members can be utilized for different purposes.

As described above, the present disclosure enables the housing section that houses the curtain member used in the vehicle cabin interior to be suppressed from imparting a claustrophobic sensation to an occupant when the curtain member is in a non-deployed state.

DETAILED DESCRIPTION

First Exemplary Embodiment

Figure 1:
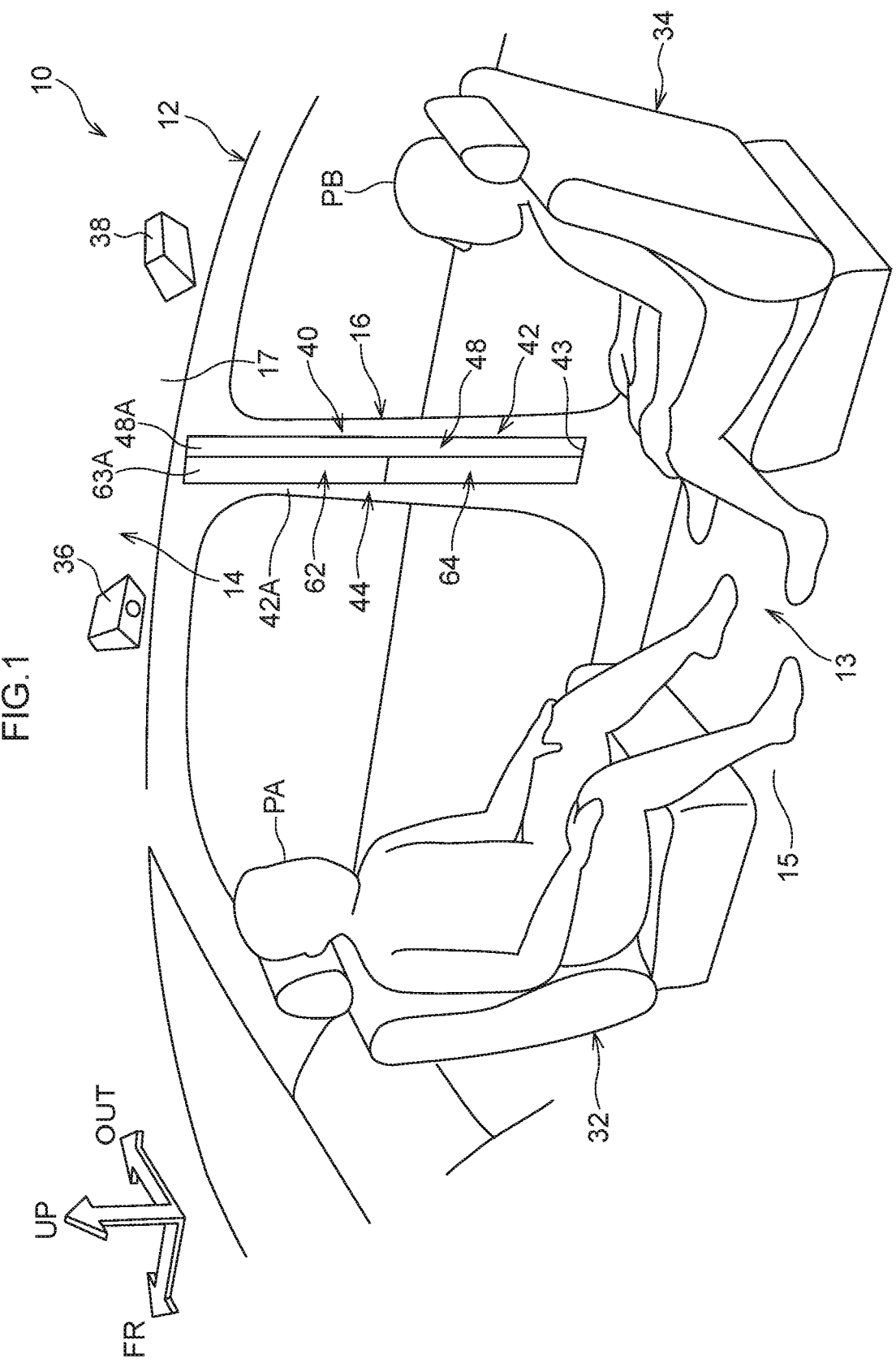
FIG. 1 is a configuration diagram illustrating a vehicle cabin interior of a vehicle provided with an interior structure according to a first exemplary embodiment.

Explanation follows regarding a vehicle 10 and an interior structure 40 of a first exemplary embodiment. Note that in the drawings, the arrow FR indicates the vehicle front (direction of travel), the arrow UP indicates a vehicle upper side, the arrow OUT indicates a vehicle width direction outer side, and the arrow IN indicates a vehicle width direction inner side. In the following explanation, unless specifically stated otherwise, reference simply to front, rear, upward, downward, left, and right directions refers, to front and rear in a vehicle front-rear direction, upward and downward in a vehicle vertical direction, and left and right in the vehicle width direction when facing the direction of travel.

Overall Configuration

As illustrated in FIG. 1, the vehicle 10 is configured including a vehicle body 12, a front seat 32, a rear seat 34, a first projector 36, a second projector 38, and the interior structure 40, serving as an example of a vehicle interior structure. The vehicle body 12 is configured including a floor section 13 serving as a floor and a roof section 14 serving as an example of a roof. A vehicle cabin 15 that accommodates an occupant PA and an occupant PB is formed inside the vehicle body 12. The vehicle body 12 includes a center pillar 16, serving as an example of a pillar. The roof section 14 includes a roof headlining 17 that faces the vehicle cabin 15. Note that each of the configurations of the vehicle 10 described hereafter have the same basic configuration on both the left and right of the vehicle 10. Explanation therefore focuses on the configuration on the right side, and explanation regarding configuration on the left side is omitted.

Figure 2:
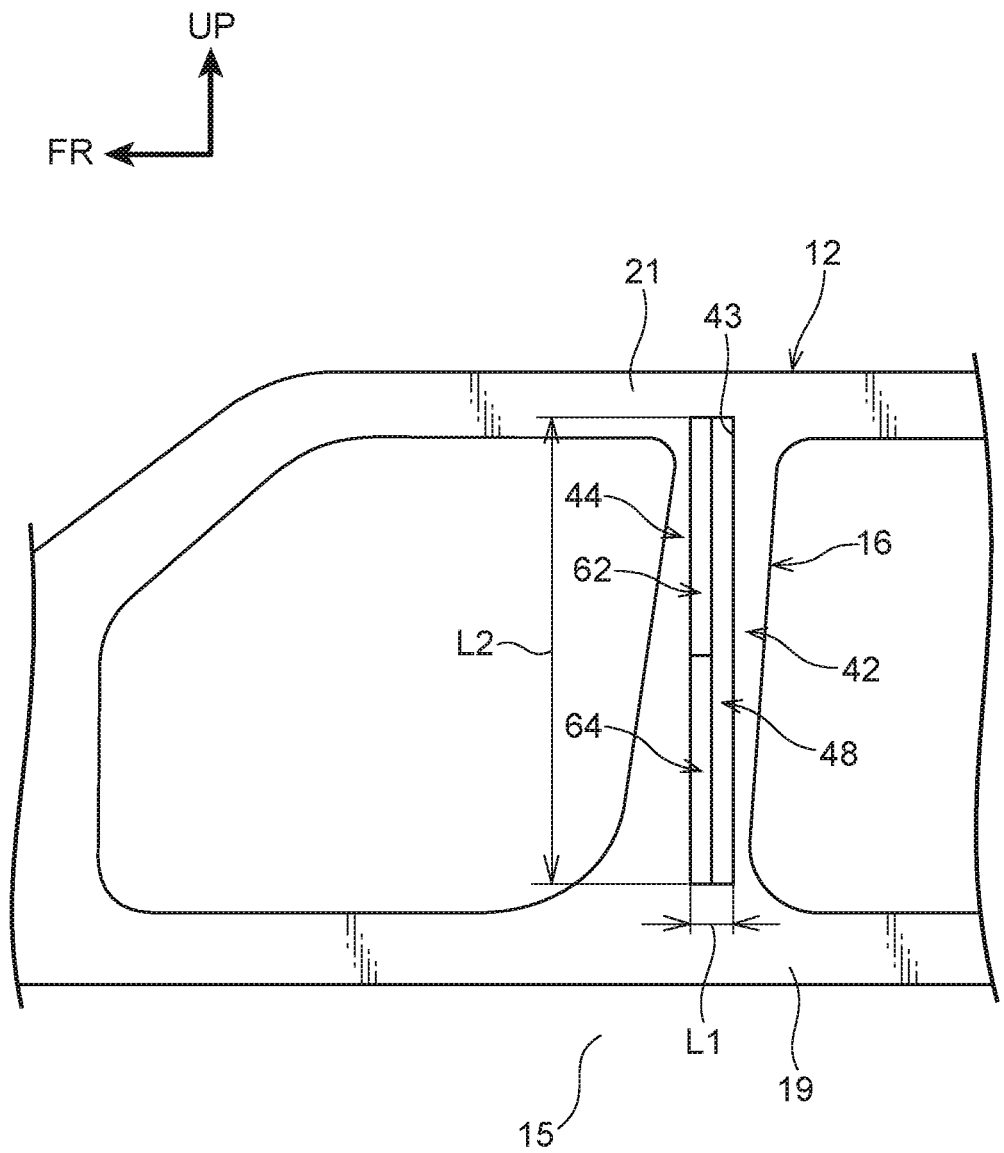
FIG. 2 is a side view illustrating a center pillar and the vicinity thereof in the vehicle illustrated in FIG. 1.

As illustrated in FIG. 2, as viewed along the vehicle width direction, the center pillar 16 projects upward at a substantially central vehicle front-rear direction portion of the vehicle 10. Specifically, a lower end portion of the center pillar 16 is joined to a rocker 19. An upper end portion of the center pillar 16 is joined to a roof-side rail 21. The center pillar 16 extends in an oblique direction intersecting the vehicle vertical direction such that the upper end portion is positioned further toward the vehicle rear side than the lower end portion.

Figure 6:
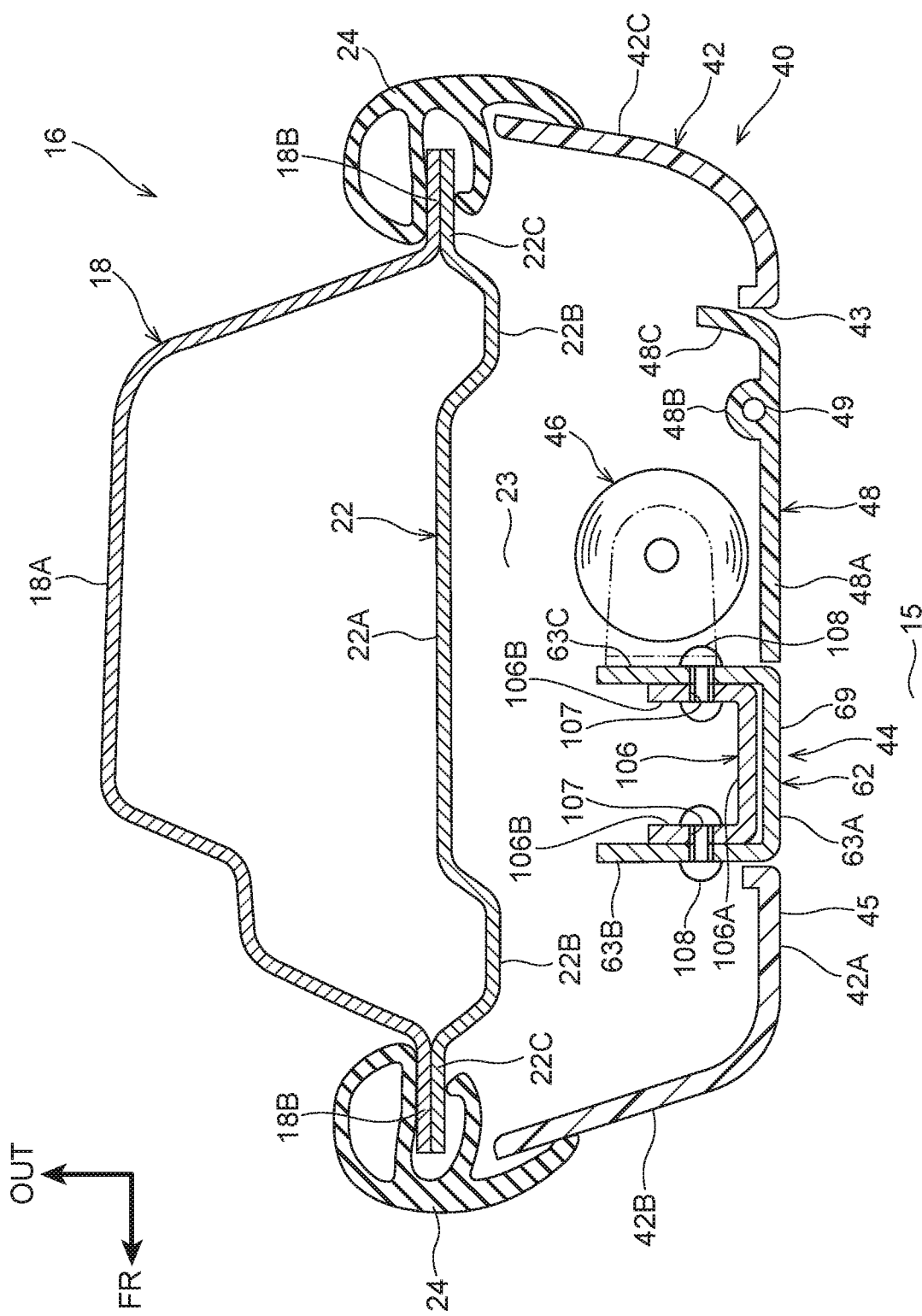
FIG. 6 is a lateral cross-section of the center pillar illustrated in FIG. 2.
Figure 7:
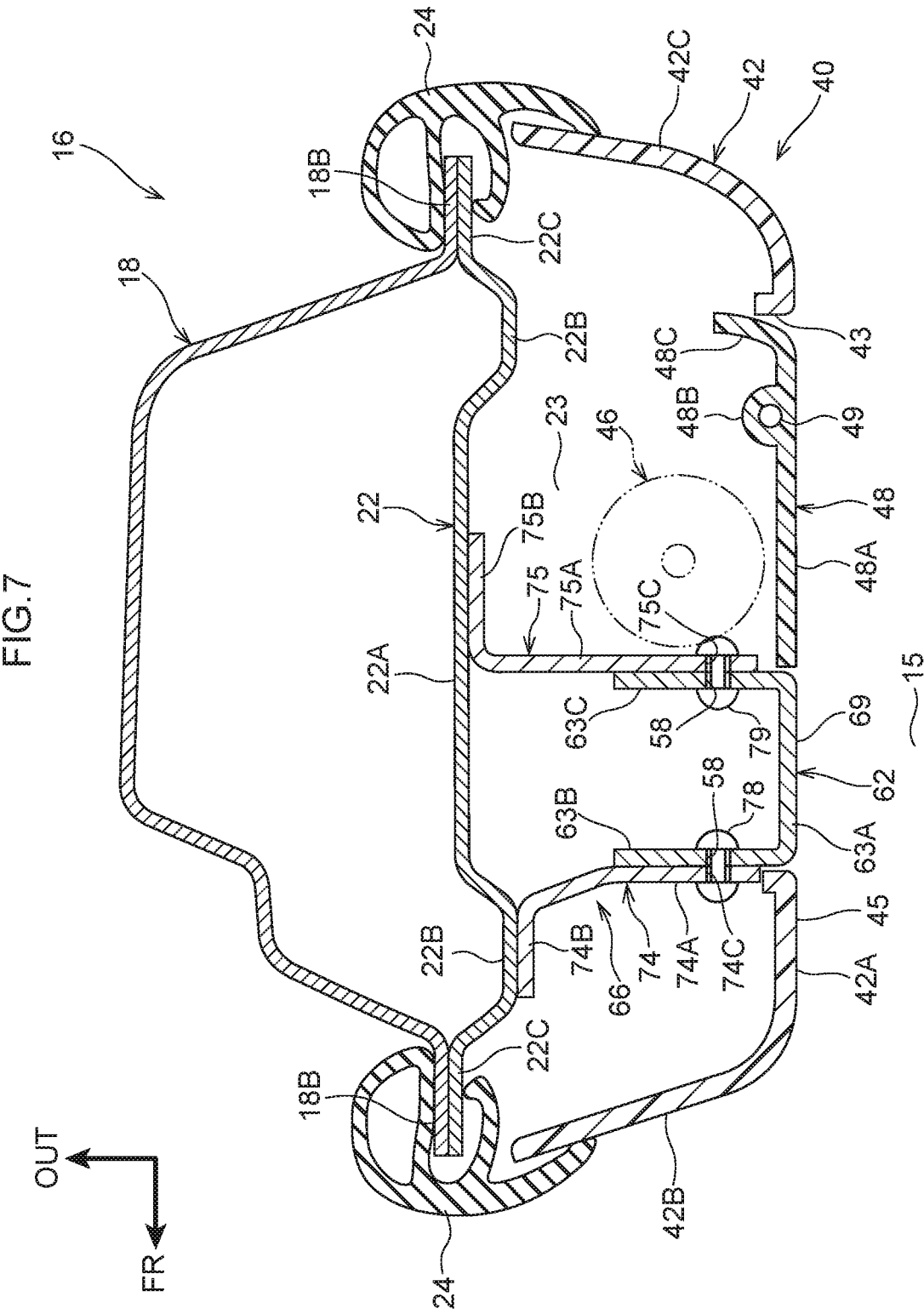
FIG. 7 is a lateral cross-section of the center pillar at a higher position than that illustrated in FIG. 6.

As illustrated in FIG. 6 and FIG. 7, as an example the center pillar 16 includes a pillar outer panel 18, a pillar inner panel 22, and opening trims 24. Moreover, the center pillar 16 is configured including a pillar garnish 42, described later (is integrated with the pillar garnish 42). As an example, the pillar outer panel 18 is made from stainless steel, and includes a base portion 18A and two flanges 18B. As viewed along the vehicle vertical direction, the pillar outer panel 18 has a substantially hat-shaped cross-section profile projecting toward the vehicle width direction outer side.

As an example, the pillar inner panel 22 is made from stainless steel, and is configured as a panel member that is short in the vehicle front-rear direction and long in the vehicle vertical direction. The pillar inner panel 22 includes a flat portion 22A running in the vehicle front-rear direction, two peaked portions 22B projecting toward the vehicle width direction inner side at a vehicle front side and vehicle rear side of the flat portion 22A, and two join portions 22C extending along the vehicle front-rear direction at the outer sides of the peaked portions 22B. Note that the pillar inner panel 22 contacts the pillar outer panel 18 from the vehicle width direction inner side, and the two join portions 22C are spot welded to the two flanges 18B to form a closed cross-section. The opening trims 24 are attached to the two join portions 22C and the two flanges 18B.

The front seat 32 illustrated in FIG. 1 is provided on the floor section 13 so as to be capable of rotating about an axial direction running in the vehicle vertical direction. During self-driving of the vehicle 10, the occupant PA seated in the front seat 32 operates a lock release lever, not illustrated in the drawings, so as to face the occupant PB seated in the rear seat 34 along the vehicle front-rear direction. As viewed along the vehicle width direction, the center pillar 16 is disposed between the mutually facing front seat 32 and rear seat 34.

The first projector 36 and the second projector 38 are examples of a projection section that projects images. The first projector 36 is fixed to a location at the vehicle front side of a lower face of the roof headlining 17, and is capable of performing projection toward the vehicle rear side. The second projector 38 is fixed to a location at the vehicle rear side of the lower face of the roof headlining 17, and is capable of performing projection toward the vehicle front side. Note that as an example in the present exemplary embodiment, the first projector 36 and the second projector 38 are exposed at the inside of the vehicle cabin 15. However, the first projector 36 and the second projector 38 may be housed within the roof section 14.

Figure 3:
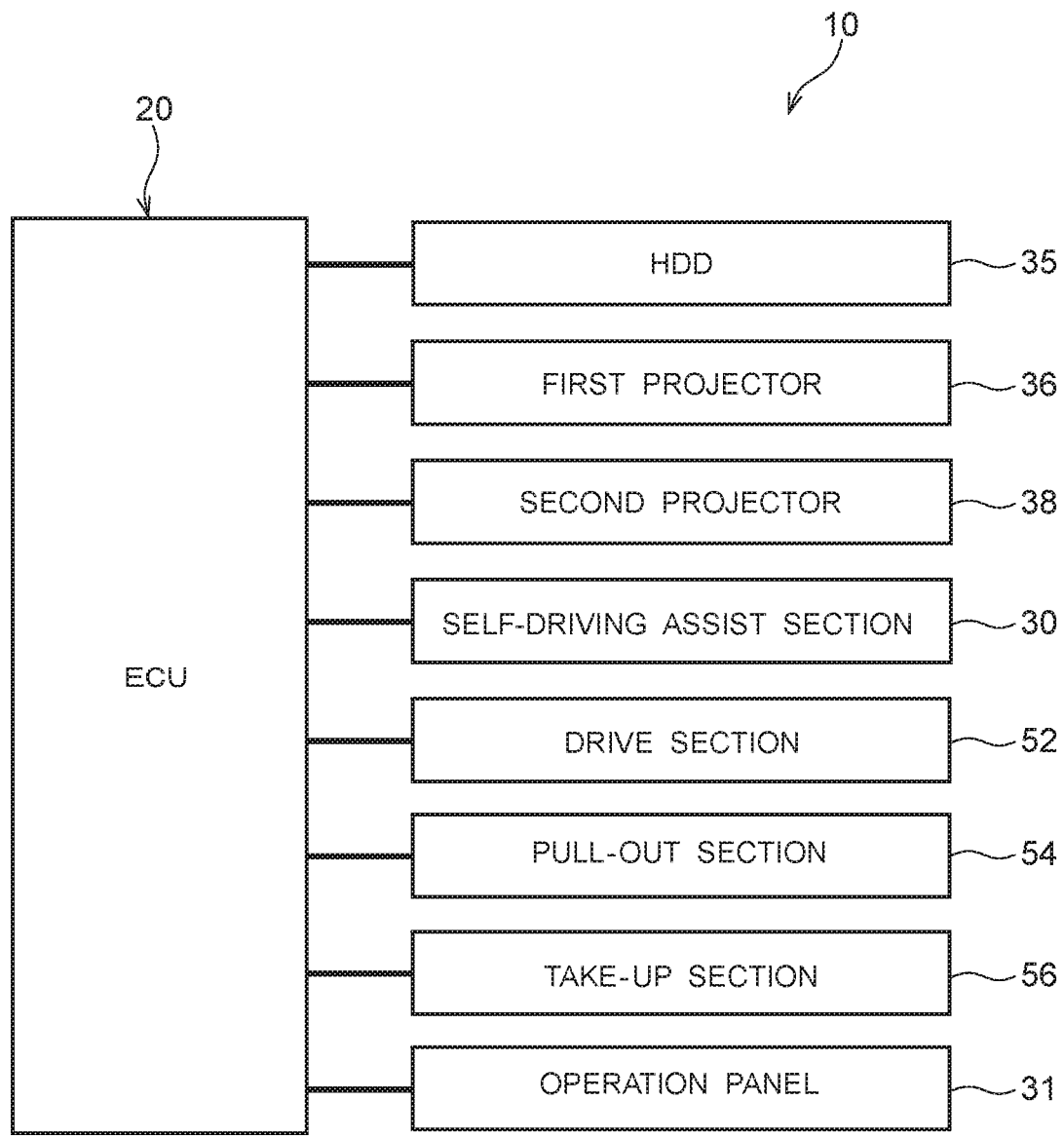
FIG. 3 is a block diagram illustrating a partial configuration of the vehicle illustrated in FIG. 1.

FIG. 3 is a block diagram illustrating partial configuration of the vehicle 10. In addition to the first projector 36 and the second projector 38, the vehicle 10 is also provided with an ECU 20, a HDD 35, a self-driving assist section 30, an operation panel 31, a drive section 52, described later, a pull-out section 54, and a take-up section 56. ECU is an abbreviation of Electronic Control Unit. HDD is an abbreviation of Hard Disk Drive.

The ECU 20 is configured by a computer including a Central Processing Unit (CPU), Read Only Memory (ROM), Random Access Memory (RAM), and the like, none of which are illustrated in the drawings. The HDD 35 stores image data to be projected by the first projector 36 and the second projector 38. Namely, the ECU 20 controls projection by the first projector 36 and the second projector 38.

To achieve self-driving of the vehicle 10, the self-driving assist section 30 determines situations relating to the vehicle itself and in the surroundings thereof based on information obtained through various non-illustrated sensors, and performs self-driving control processing to control an acceleration amount, a braking amount, a steering angle, and the like. In other words, a driving state of the vehicle 10 becomes a self-driving state during operation of the self-driving assist section 30. When operation of the self-driving assist section 30 stops, the driving state of the vehicle 10 becomes a driver-driven state in which a driver (the occupant PA (see FIG. 1)) physically operates the vehicle 10.

The operation panel 31 is, as an example, configured by a non-illustrated touch panel, and displays plural buttons used to start operation and stop operation of various sections of the vehicle 10. The plural buttons include, for example, a button to decide whether or not to perform projection, a button to decide whether or not to perform self-driving, and buttons used to operate the drive section 52, the pull-out section 54, and the take-up section 56, described later.

Relevant Configuration

Explanation follows regarding the interior structure 40.

Figure 4:
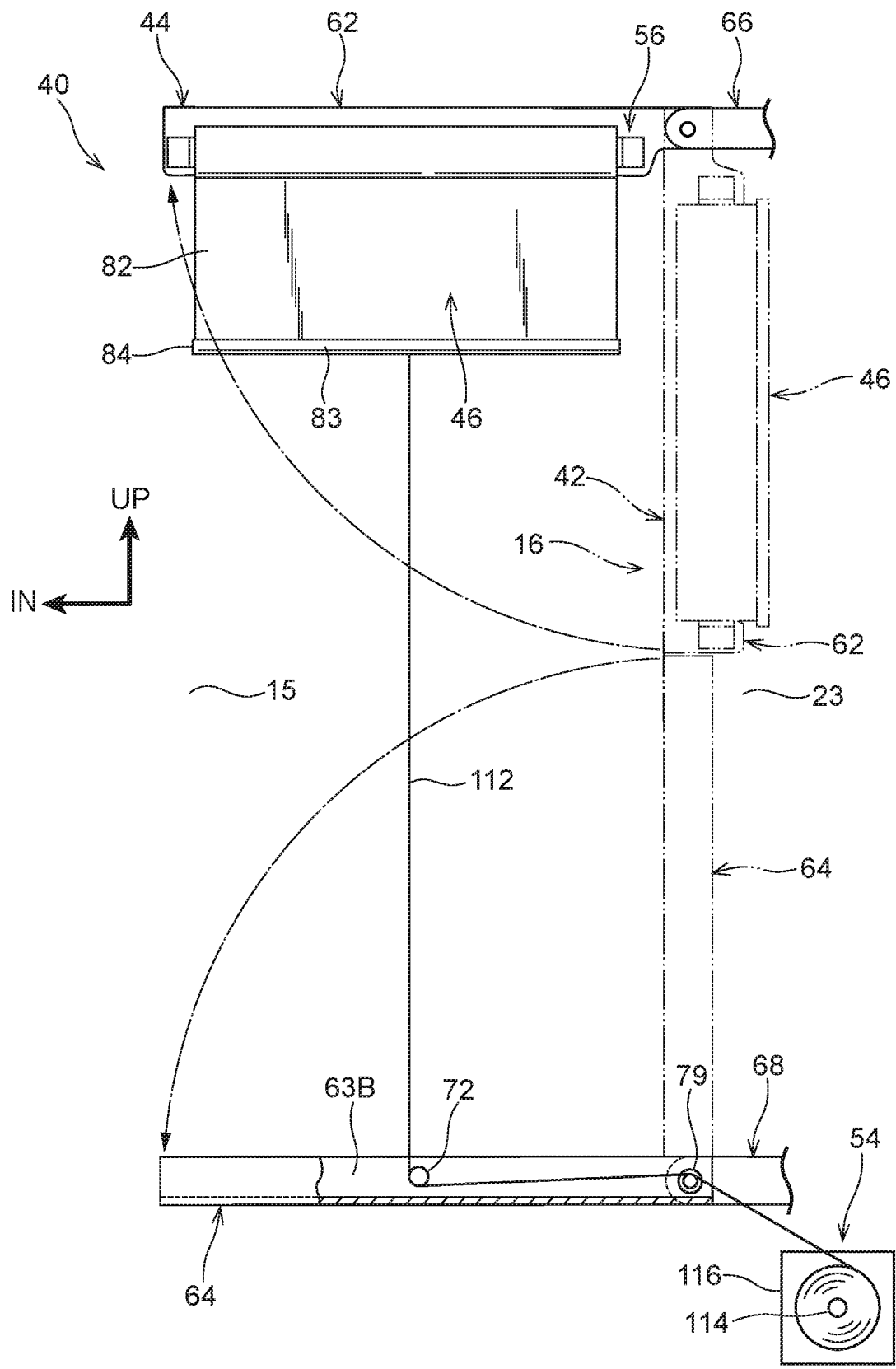
FIG. 4 is a configuration diagram of an interior structure according to the first exemplary embodiment.

The interior structure 40 illustrated in FIG. 4 includes the pillar garnish 42, serving as an example of a vehicle interior member, a channel member 44 serving as an example of a moving member, and a screen member 46 serving as an example of a curtain member. The interior structure 40 is also provided with an opening-closing door 48 (see FIG. 6) serving as an example of an opening-closing member, the drive section 52 (see FIG. 3), the pull-out section 54, and the take-up section 56.

Pillar Garnish

The pillar garnish 42 illustrated in FIG. 2 is a member provided on the vehicle cabin 15 side of the center pillar 16, and configures part of the center pillar 16. As an example, the pillar garnish 42 is a resin member, and extends along the same oblique direction as the center pillar 16 mentioned above. The pillar garnish 42 is formed with an opening 43 that penetrates the pillar garnish 42 in the vehicle width direction toward, the vehicle cabin 15.

As viewed along the vehicle width direction, the opening 43 is, as an example, formed in a rectangular shape that is long in the vehicle vertical direction and short in the vehicle front-rear direction. The vehicle front-rear direction length of the opening 43 is L1 mm. The vehicle vertical direction length of the opening 43 is L2 mm.

As illustrated in FIG. 6 and FIG. 7, as viewed along the vehicle vertical direction, the pillar garnish 42 has a substantially hat-shaped cross-section profile bulging toward the vehicle cabin 15 side (opening toward the vehicle width direction outer side). Specifically, the pillar garnish 42 includes a vertical wall 42A, a front wall 42B, and a rear wall 42C. The vertical wall 42A is, as art example, configured as a flat wall body extending along the vehicle front-rear direction with its thickness in the vehicle width direction. The front wall 42B extends from a front end portion of the vertical wall 42A toward the vehicle width direction outer side. The rear wall 42C extends from a rear end portion of the vertical wall 42A toward the vehicle width direction outer side.

The opening trims 24 are provided at vehicle width direction outer side end portions of the front wall 42B and the rear wall 42C. The center pillar 16 is formed with a housing section 23, serving as a space, between the pillar inner panel 22 and the pillar garnish 42. The housing section 23 is in communication with the interior of the vehicle cabin 15 through the opening 43. The pillar garnish 42 is thus integral with the center pillar 16, with the opening 43 being formed facing the vehicle cabin 15 and the hollow housing section 23 being formed on the opposite side of the pillar garnish 42 to the vehicle cabin 15.

Channel Members

The channel member 44 illustrated in FIG. 4 includes a first channel member 62 serving as an example of an upper member, and a second channel member 64 serving as an example of a lower member. The channel member 44 further includes a support bracket 66 that supports the first channel member 62 and a support bracket 68 that supports the second channel member 64. The channel member 44 is provided at the center pillar 16 so as to be capable of being housed in the housing section 23 and capable of moving toward the vehicle cabin 15 through the opening 43 (see FIG. 2).

First Channel Member

Figure 5:
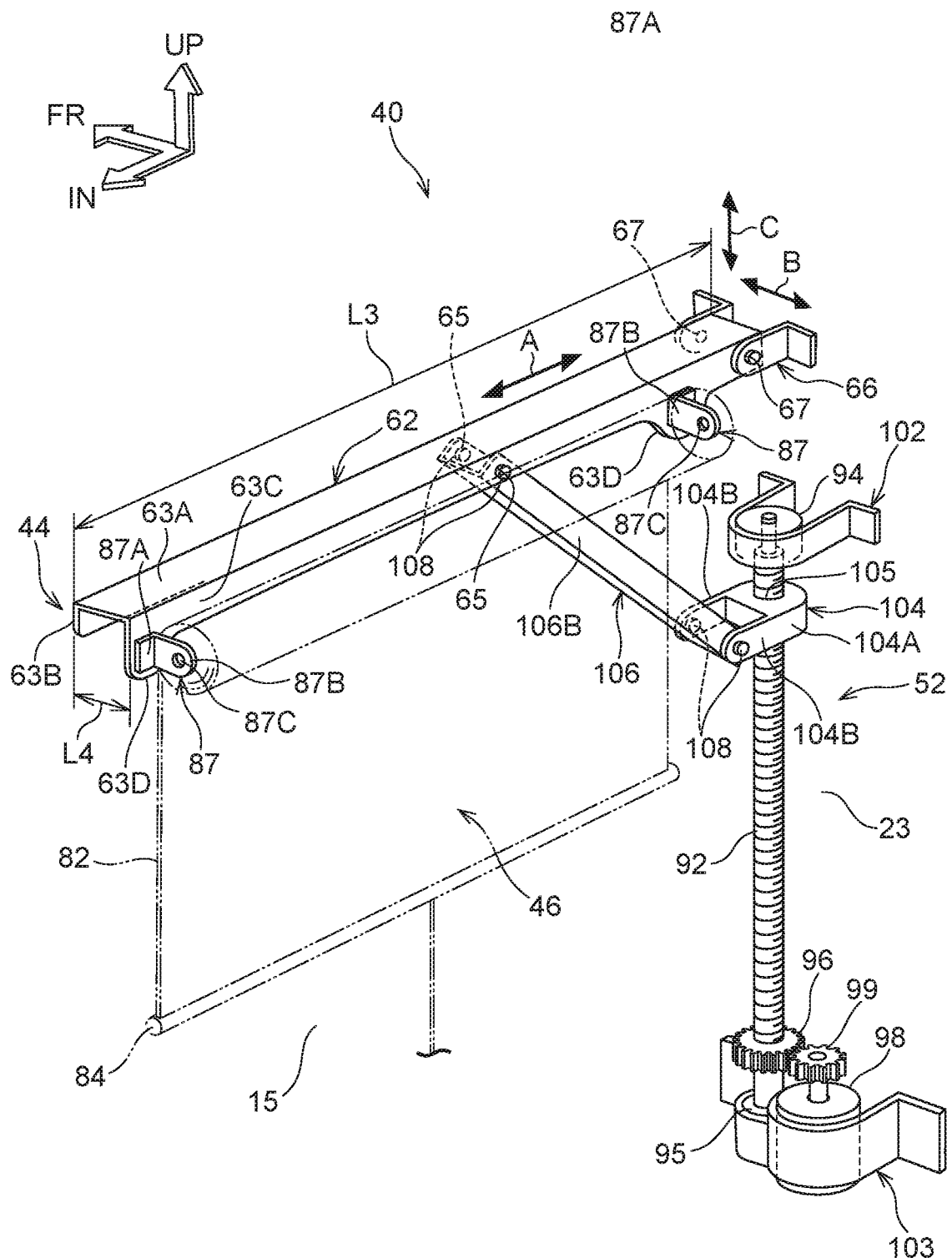
FIG. 5 is a perspective view illustrating the interior structure illustrated in FIG. 4.

The first channel member 62 illustrated in FIG. 5 is a member that is long in one direction (referred to hereafter as the A direction). The length of the first channel member 62 in the A direction is L3 mm. The length L3 is shorter than the length L2 described above (see FIG. 2). The first channel member 62 includes a base portion 63A, a side portion 63B, and a side portion 63C, all of which have plate shapes as viewed along the A direction.

As viewed along its thickness direction, the base portion 63A is formed in a rectangular shape that is long in the A direction and short in a B direction, the B direction being a direction orthogonal to the A direction. The thickness direction of the base portion 63A is referred to as the C direction. The A direction, the B direction, and the C direction are mutually orthogonal to one another. The B direction length of the base portion 63A is L4 mm. The length L4 is, shorter than the length L1 described above (see FIG. 2).

The side portion 63B projects along the C direction at a right angle from one B direction end portion of the base portion 63A. The side portion 63C projects along the C direction at a right angle from the other B direction end portion of the base portion 63A, in the present exemplary embodiment, as an example, in a state in which the first channel member 62 has finished moving into the vehicle cabin 15 (see FIG. 1), the first channel member 62 is disposed such that the A direction runs in the vehicle width direction, the B direction runs in the vehicle front-rear direction, and the C direction runs in the vehicle vertical direction.

The side portion 63B is disposed at the vehicle front-rear direction front side. As viewed along the vehicle front-rear direction, the side portion 63B has a substantially rectangular shape that is long in the vehicle width direction and short in the vehicle vertical direction. A coupling hole 65 penetrating in the vehicle front-rear direction is formed through a substantially central vehicle width direction portion of the side portion 63B. A coupling hole 67 penetrating in the vehicle front-rear direction is formed through one vehicle width direction end portion (a base end side end portion) of the side portion 63B.

The side portion 63C is disposed at the vehicle front-rear direction rear side. As viewed along the vehicle front-rear direction, the side portion 63C has a substantially rectangular shape that is long in the vehicle width direction and short in the vehicle vertical direction. A coupling hole 65 penetrating in the vehicle front-rear direction is formed through a substantially central vehicle width direction portion of the side portion 63C. A coupling hole 67 penetrating in the vehicle front-rear direction is also formed through one vehicle width direction end portion (a base end side end portion) of the side portion 63C.

Attachment locations 63D are formed projecting toward the vehicle vertical direction lower side at a base end side and a leading end side of the vehicle width direction center of the side portion 63C. The height of the side portion 63B and the height of the side portion 63C in the vehicle vertical direction are substantially the same height, with the exception of at the attachment locations 63D. Note that the first channel member 62 moves from the housing section 23 toward the upper side (toward the roof section 14 (see FIG. 1)) inside the vehicle cabin 15.

As illustrated in FIG. 6, in a state in which the first channel member 62 is housed in the housing section 23, a front face 69 on the vehicle cabin 15 side of the base portion 63A and a front face 45 on the vehicle cabin 15 side of the vertical wall 42A lie substantially in a single plane running in the vehicle front-rear direction (are disposed with substantially no step between each other).

Second Channel Member

The second channel member 64 illustrated FIG. 4 is, as an example, configured similarly to the first channel member 62 but Without the attachment locations 63D (see FIG. 5). The second channel member 64, including the drive section 52 (see FIG. 3) that moves the second channel member 64, is disposed so as to be symmetrical to the first channel member 62 about a vehicle vertical direction center. Explanation regarding configuration similar to that of the first channel member 62 is therefore omitted.

A pulley member 72 that connects the side portion 63B and the side portion 63C (see FIG. 5) together in the vehicle front-rear direction is provided at a substantially central vehicle width direction portion of the second channel member 64. The pulley member 72 includes a rotating portion and a shaft portion, not illustrated in the drawings, running along the vehicle front-rear direction, such that the rotating portion is capable of rotating about the shall portion. The second channel member 64 is configured to move from the housing section 23 toward the lower side (toward the floor section 13 (see FIG. 1)) inside the vehicle cabin 15. Moreover, similarly to the first channel member 62, the second channel member 64 and the front face 45 (see FIG. 6) lie in a single plane running along the vehicle front-rear direction when in a housed state in the housing section 23.

Support Bracket

The support bracket 66 illustrated in FIG. 7 includes a front bracket 74 and a rear bracket 75. The front bracket 74 includes an extension portion 74A extending along the vehicle width direction, and a fixing portion 74B extending from a vehicle width direction outer side end of the extension portion 74A toward the vehicle front side. A through hole 74C penetrating in the vehicle front-rear direction is formed through the extension portion 74A. The rear bracket 75 includes an extension portion 75A extending along the vehicle width direction, and a fixing portion 75B extending from a vehicle width direction outer side end of the extension portion 75A toward the vehicle rear side. A through hole 75C penetrating in the vehicle front-rear direction is formed through the extension portion 75A. As an example, the fixing portion 74B is joined to one of the peaked portions 22B by spot welding. As an example, the fixing portion 75B is joined to the flat portion 22A by spot welding.

A circular column shaped joint member 78 is inserted through the through hole 74C and one through hole 58 so as to couple the side portion 63B to the extension portion 74A so as to be capable of rotating relative thereto. A circular column shaped joint member 79 is inserted through the through hole 75C and another through hole 58 so as to couple the side portion 63C to the extension portion 75A so as to be capable of rotating relative thereto. The joint member 78 and the joint member 79 are aligned in the vehicle front-rear direction. In this manner, the first channel member 62 is coupled to the support bracket 66 with a rotation axial direction running in the vehicle front-rear direction, and is capable of pivoting about the joint member 78 and the joint member 79.

The structure of the support bracket 68 illustrated in FIG. 4 is, as an example, similar to the structure of the support bracket 66, and so explanation thereof is omitted. Note that the support bracket 68 is joined to the flat portion 22A and one of the peaked portions 22B (see FIG. 6) at a lower portion of the center pillar 16 by spot welding, and pivotably supports the second channel member 64.

Screen Member

The screen member 46 illustrated in FIG. 4 includes, as an example, a fabric screen body 82 and a circular column shaped auxiliary member 84. The screen body 82 is formed in a rectangular shape as viewed along its thickness direction. In a deployed state, a vehicle width direction length of the screen body 82 is shorter than the length L3 described above (see FIG. 5). A vehicle vertical direction length of the screen body 82 is approximately twice the length L3.

Both a front face (the face on the vehicle front-rear direction front side) and a back face (rear side face) of the screen body 82 are formed with a white projection target portion, not illustrated in the drawings, onto which images can be projected. A lower end portion of the screen body 82 (an end portion on the side from which the screen member 46 is pulled out) is formed with a tube shaped portion 83 with an axial direction in the vehicle width direction. The auxiliary member 84 is inserted into the tube shaped portion 83 so as to suppress deformation of a lower end portion of the screen member 46.

The screen member 46 is provided in the first channel member 62 when in a non-deployed state. The screen member 46 is housed in the housing section 23 when in the non-deployed state. The non-deployed state of the screen member 46 refers to a state in which the screen member 46 has been taken up by the take-up section 56, described later. A deployed state of the screen member 46 refers to a state in which the screen member 46 has been pulled out by the pull-out section 54, described later, to enable projection onto the projection target portion.

The screen member 46 is further provided with the channel member 44 to enable deployment in the vehicle cabin 15 in a state in which the channel member 44 has already moved into the vehicle cabin 15. In other words, the screen member 46 does not deploy while the channel member 44 is moving into the vehicle cabin 15, but deploys in the vehicle cabin 15 in a state in which the channel member 44 has finished moving into the vehicle cabin 15.

Take-Up Section

Figure 8:
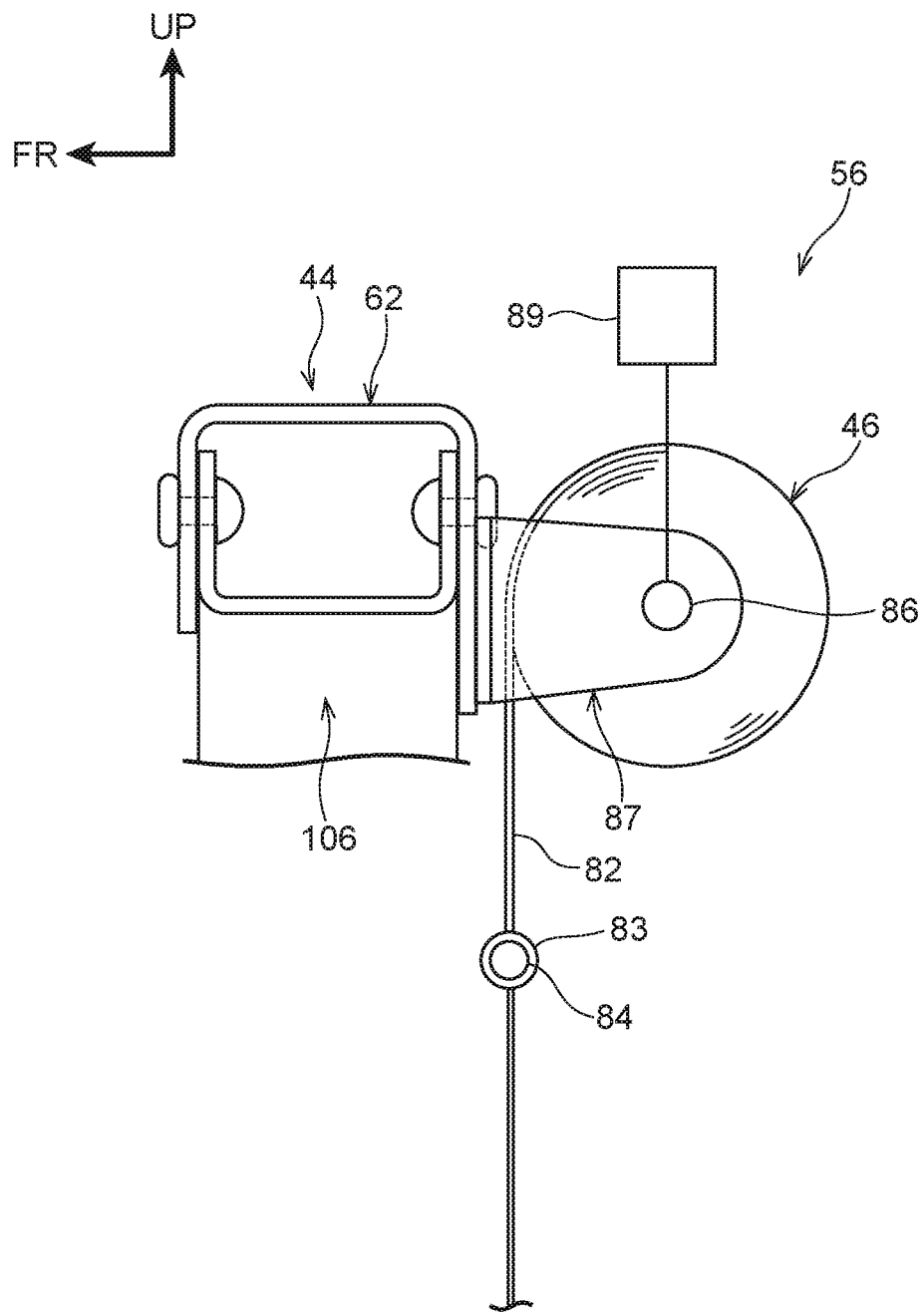
FIG. 8 is an enlarged partial side view illustrating parts of a channel member and a screen member illustrated in FIG. 4 as viewed along a vehicle width direction.

The take-up section 56 illustrated in FIG. 8 includes, as an example, a circular column shaped shaft 86, two brackets 87 (see FIG. 5) that rotatably support the shaft 86, and a motor 89 to rotate the shaft 86.

As illustrated in FIG. 5, the two brackets 87 are each configured by bending a metal plate member into an L-shape, and include an attachment portion 87A and a support portion 87B. The attachment portions 87A are attached to the attachment locations 63D described above using non-illustrated screws. A through hole 87C is formed penetrating the support portion 87B in its thickness direction. The two axial direction end portions of the shaft 86 are inserted into the through holes 87C. The two brackets 87 thus rotatably support the shaft 86. A non-illustrated gear is fixed to one axial direction end portion of the shaft 86.

An end portion of the screen body 82 on the opposite side to the auxiliary member 84 is attached to an outer peripheral face of the shaft 86. The motor 89 is fixed to the bracket 87 on one side, and the shaft 86 is rotated by rotating the non-illustrated gear mentioned above. A non-illustrated retractor mechanism is provided partway along a transmission path for rotation force generated by operation of the motor 89 in order to switch between transmitting rotation force and cutting off this transmission. By switching the retractor mechanism, the shaft 86 is rendered capable of rotating in one direction only when taking up the screen body 82, and the shaft 86 is capable of rotating freely when the screen body 82 is being pulled.

Opening-Closing Door

As illustrated in FIG. 2, the opening-closing door 48 extends along the vehicle vertical direction, and closes off a portion of the opening 43 where the channel member 44 is not provided. Note that the explanation regarding placement of the opening-closing door 48 applies to a closed-off state in which the opening-closing door 48 has closed off this portion of the opening 43.

As illustrated in FIG. 6, the opening-closing door 48 is capable of opening up and closing off at least a portion of the opening 43 on the vehicle cabin 15 side of the screen member 46 in the housing section 23. As an example, the opening-closing door 48 is configured by a resin member. As viewed along the vehicle vertical direction, the opening-closing door 48 includes a flat plate portion 48A, a cylinder portion 48B, and a suppressing portion 48C.

The flat plate portion 48A is disposed with its thickness direction in the vehicle width direction. The cylinder portion 48B is integrally formed to the flat plate portion 48A at a location at the rear side of the vehicle front-rear direction center of the flat plate portion 48A and on the side of the housing section 23. The cylinder portion 48B is formed in a circular cylinder shape and is open in the vehicle vertical direction. The suppressing portion 48C is a small flap formed by bending a vehicle front-rear direction rear end portion of the flat plate portion 48A toward the vehicle width direction outer side, and has a function of suppressing the entry of dust, and the like into the housing section 23 through a gap between the opening-closing door 48 and the opening 43.

A metal shaft 49 with its axial direction in the vehicle vertical direction is inserted into the cylinder portion 48B. An upper end portion and a lower end portion of the shaft 49 are rotatably supported by non-illustrated brackets provided at an upper portion and lower portion of the opening 43 in the pillar garnish 42. Namely, the opening-closing door 48 is capable of rotating (pivoting) about the metal shaft 49, and is capable of opening up and closing off the portion of the opening 43.

As an example, the opening-closing door 48 is biased by a non-illustrated torsion spring or the like so as to close off the opening 43. Accordingly, in cases in which the channel member 44 has not been moved into the vehicle cabin 15, the portion of the opening 43 is retained in a state closed off by the opening-closing door 48 (the closed-off state). As an example, the flat plate portion 48A, the base portion 63A, and the vertical wall 42A are aligned in the vehicle front-rear direction when the opening-closing door 48 is in the closed-off state.

Drive Section

As an example, the drive section 52 illustrated in FIG. 5 includes a rod 92, a shaft bearing 94, a shaft bearing 95, a gear 96, a motor 98, a bracket 102, a bracket 103, a nut member 104, a link member 106, and four coupling pins 108. The drive section 52 is housed in the housing section 23 (see FIG. 6). The drive section 52 is configured to drive the channel member 44 toward the housing section 23 and the vehicle cabin 15.

The rod 92 is disposed with its axial direction in the vehicle vertical direction. A male thread is formed at an outer peripheral face of the rod 92. The shaft bearing 94 is provided at one axial direction end portion of the rod 92, and the shaft bearing 95 is provided at the other axial direction end portion of the rod 92. The gear 96 is attached to the other end portion of the rod 92. The shaft bearing 94 is supported by the bracket 102. The bracket 102 is fixed to an upper portion of the pillar inner panel 22 (see FIG. 6) by screws, not illustrated in the drawings. The shaft bearing 95 is supported by the bracket 103. The bracket 103 is fixed to a lower portion of the pillar inner panel 22 by screws, not illustrated in the drawings.

The motor 98 includes a pinion 99, and is supported by the bracket 103 together with the shaft bearing 95 such that the direction of its rotation shaft runs in the vehicle vertical direction. The pinion 99 meshes with the gear 96. The rod 92 is thereby rotated forward or rotated in reverse when the motor 98 is driven for forward rotation drive or driven for reverse rotation.

As an example, the nut member 104 includes a plate shaped base 104A with its thickness direction in the vehicle vertical direction, and two arms 104B extending from the two vehicle front-rear direction end portions of the base 104A toward the vehicle cabin 15. A threaded hole 105 penetrating in the vehicle vertical direction is formed through the base 104A. The threaded hole 105 is formed with a female thread, not illustrated in the drawings. The female thread of the threaded hole 105 meshes with the male thread of the rod 92. When the rod 92 is rotated forward by the motor 98, the nut member 104 moves toward the upper side. When the rod 92 is rotated in reverse by the motor 98, the nut member 104 moves toward the lower side. Through holes, not illustrated in the drawings, penetrating in the vehicle front-rear direction are respectively formed through the two arms 104B. The circular column shaped coupling pins 108 are inserted into these through holes. Note that the nut member 104 is guided in the vehicle vertical direction by a non-illustrated guide member.

The link member 106 illustrated in FIG. 6 is a member that is long in one direction (an axial direction). As viewed along its axial direction, the link member 106 has a substantially U-shaped cross-section profile. Specifically, the link member 106 includes a base portion 106A, and two side portions 106B projecting at right angles from the two ends of the base portion 106A. Through holes, not illustrated in the drawings, are formed through end portions on the nut member 104 side (see FIG. 5) of the side portions 106B. The coupling pins 108 (see FIG. 5) are inserted into these through holes. Namely, the link member 106 is coupled to the nut member 104 so as to be capable of rotating relative to the coupling pins 108 about an axis of the coupling pins 108.

Through holes 107 (see FIG. 6) are formed through first channel member 62 side end portions of the side portions 106E illustrated in FIG. 5. The coupling pins 108 are inserted into the through holes 107. The coupling pins 108 are also inserted into the coupling holes 65 in the first channel member 62. Namely, the link member 106 is coupled to the first channel member 62 so as to be capable of rotating relative to the coupling pins 108 about an axis of the coupling pins 108. The link member 106 is configured to move the first channel member 62 toward the vehicle cabin 15 or toward the housing section 23 accompanying movement of the nut member 104 toward the upper side or lower side.

Pull-Out Section

As an example, the pull-out section 54 illustrated in FIG. 4 includes a rope 112 serving as a cord member, a roller member 114, and a motor 116 that rotates the roller member 114. One end portion of the rope 112 is attached to an outer peripheral face of the roller member 114. The rope 112 leads out from the roller member 114 toward the vehicle vertical direction upper side via the joint member 79 and the pulley member 72. The other end portion of the rope 112 is attached to a vehicle width direction central portion of the tube shaped portion 83. In other words, the rope 112 is attached to the screen member 46 through the second channel member 64.

In the pull-out section 54, the motor 116 is driven in a pulling-enabled state of the screen member 46 such that the rope 112 is taken up onto the outer peripheral face of the roller member 114, thereby pulling the screen member 46 toward the lower side. In other words, the pull-out section 54 is configured to pull the screen member 46 from the first channel member 62 side toward the second channel member 64 side. Note that when the screen member 46 has been taken up by the take-up section 56, the roller member 114 of the pull-out section 54 is capable of rotating freely regardless of the state of the motor 116. Namely, tension in the rope 112 is loosened. However, the pull-out section 54 applies the rope 112 with sufficient tension to avoid excessive slack arising in the rope 112.

Operation and Effects

Explanation follows regarding operation and effects of the interior structure 40 of the first exemplary embodiment.

As an example, the vehicle 10 illustrated in FIG. 1 is set to a self-driving state, and the front seat 32 is disposed facing the rear seat 34. In the housed state of the channel member 44, the flat plate portion 48A, the base portion 63A, and the vertical wall 42A are disposed lying in a single plane running along the vehicle front-rear direction. Accordingly, the occupant PA and the occupant PB in the vehicle cabin 15 are aware of the center pillar 16, but are not aware of the housing section 23 (see FIG. 6). Namely, the housing section 23 is suppressed from imparting a claustrophobic sensation to the occupant PA and the occupant PB.

Figure 9:
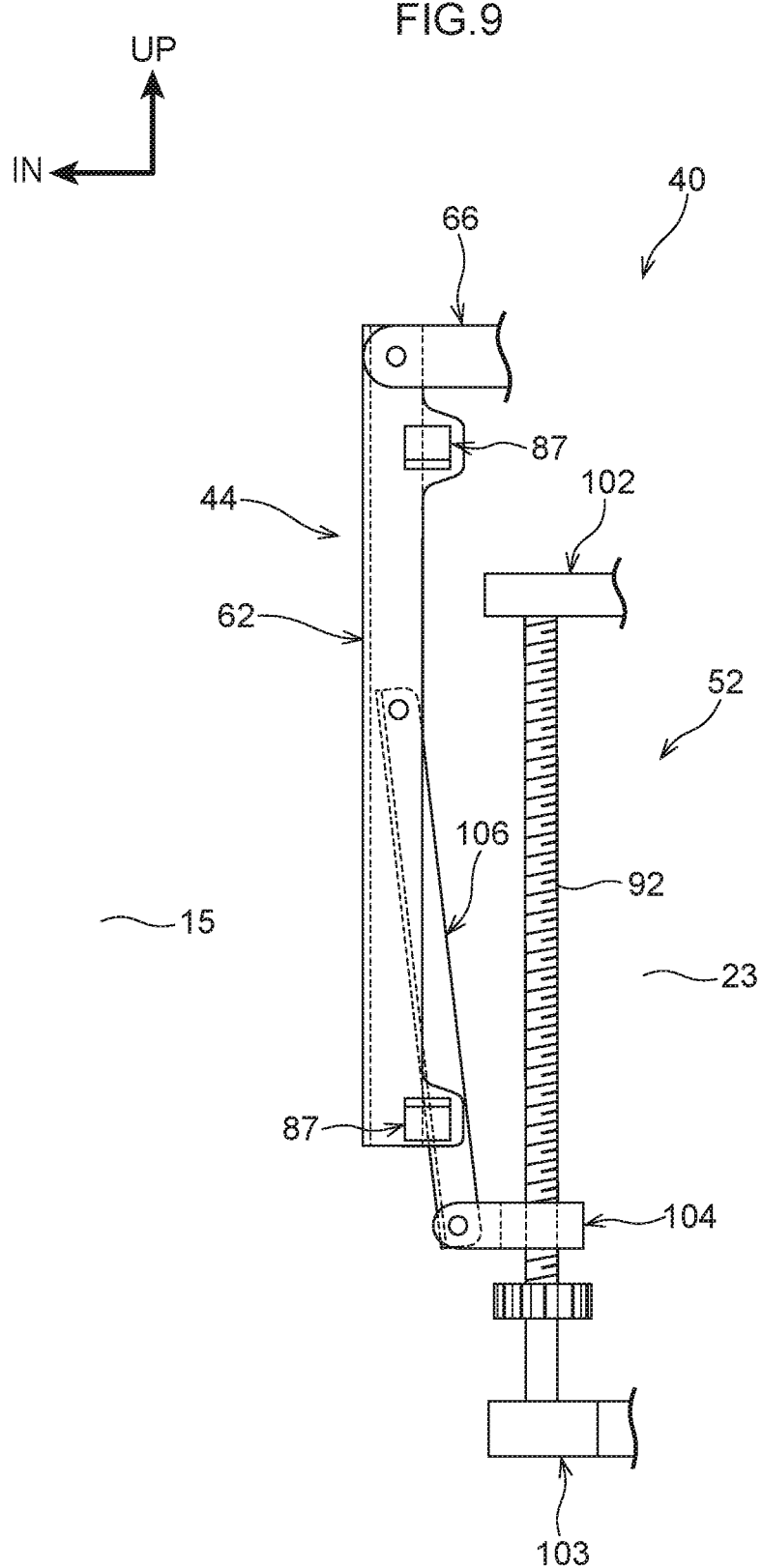
FIG. 9 is a back face view illustrating the channel member illustrated in FIG. 4 in a housed state as viewed along a vehicle front-rear direction.

As illustrated in FIG. 9, in the housed state of the first channel member 62, the nut member 104 is disposed at a lower portion of the rod 92. A leading end side (the opposite side to the support bracket 66) of the first channel member 62 hangs down under its own weight, so as to be disposed in a state running almost in the vehicle vertical direction. The link member 106 is thus disposed in a state projecting at a right angle (and slightly inclined) toward the upper side from the nut member 104. Note that in FIG. 9, to facilitate understanding of the placement of the members, the drive section 52 is illustrated in an enlarged state relative to the first channel member 62; reality, the drive section 52 is provided further toward the upper side than a position at the same height as a position of the lower end of the first channel member 62. Accordingly, the drive section 52 does not affect movement of the second channel member 64 (see FIG. 4). The screen member 46 (see FIG. 4) is omitted from illustration in FIG. 9 and FIG. 10.

When the occupant PA (see FIG. 1) operates a non-illustrated button on the operation panel 31 illustrated in FIG. 3, the channel member 44 (see FIG. 4) begins to move.

Figure 10:
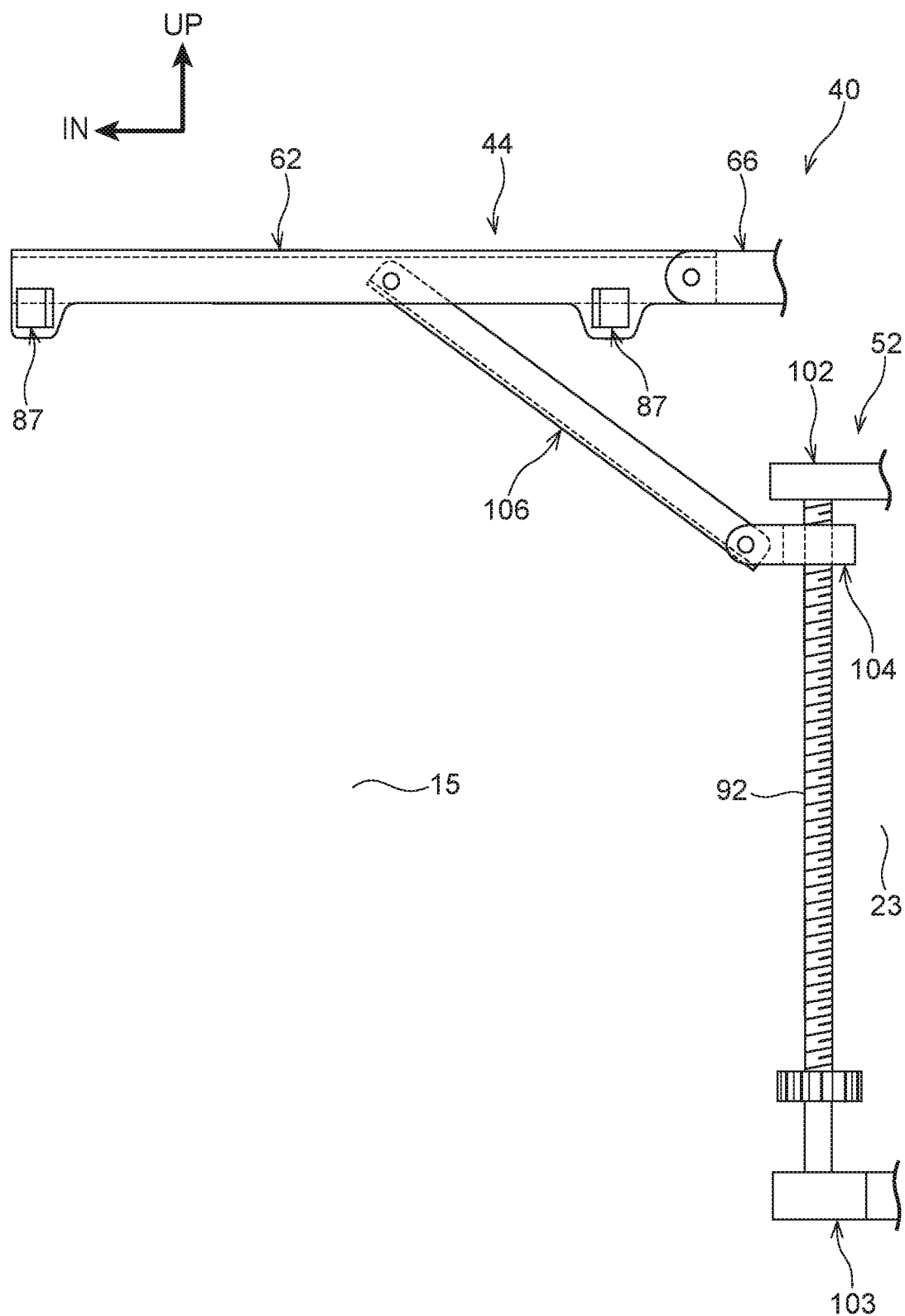
FIG. 10 is a back face view illustrating the channel member illustrated in FIG. 4 in a deployed state as viewed along the vehicle front-rear direction.

When the rod 92 illustrated in FIG. 10 rotates such that the nut member 104 moves toward an upper portion of the rod 92, the leading end side (first channel member 62 side) of the link member 106 attempts to descend under its own weight. Accordingly, a coupling portion between the first channel member 62 and the link member 106 moves toward the vehicle cabin 15. The first channel member 62 is thereby disposed in a state in which its axial direction runs along the vehicle width direction. In other words, the first channel member 62 projects from the center pillar 16 (see FIG. 1) toward an upper portion of the vehicle cabin 15.

The second channel member 64 illustrated in FIG. 4 is displaced in substantially the same manner as the first channel member 62 so as to project toward a lower portion of the vehicle cabin 15. Note that when this is performed, the opening-closing door 48 (see FIG. 6) pivots toward the vehicle cabin 15 as a result of being contacted by the screen member 46 as it moves in the vehicle width direction toward the vehicle cabin 15. The opening 43 (see FIG. 6) is thus partially opened up.

In a projecting state of the first channel member 62 and the second channel member 64, the pull-out section 54 pulls the rope 112 toward the vehicle vertical direction lower side. The screen member 46 is thus deployed in the vehicle cabin 15 so as to run along the vehicle vertical direction. A lower end portion of the deployed screen member 46 is housed inside the second channel member 64. The screen member 46 is thus placed in a state supported by the second channel member 64. Movement of the screen member 46 in the vehicle front-rear direction is restricted due to the screen member 46 contacting the side portion 63B and the side portion 63C of the second channel member 64 (see FIG. 7), enabling deformation of the projection faces (the front face and the back face) to be suppressed.

Figure 11:
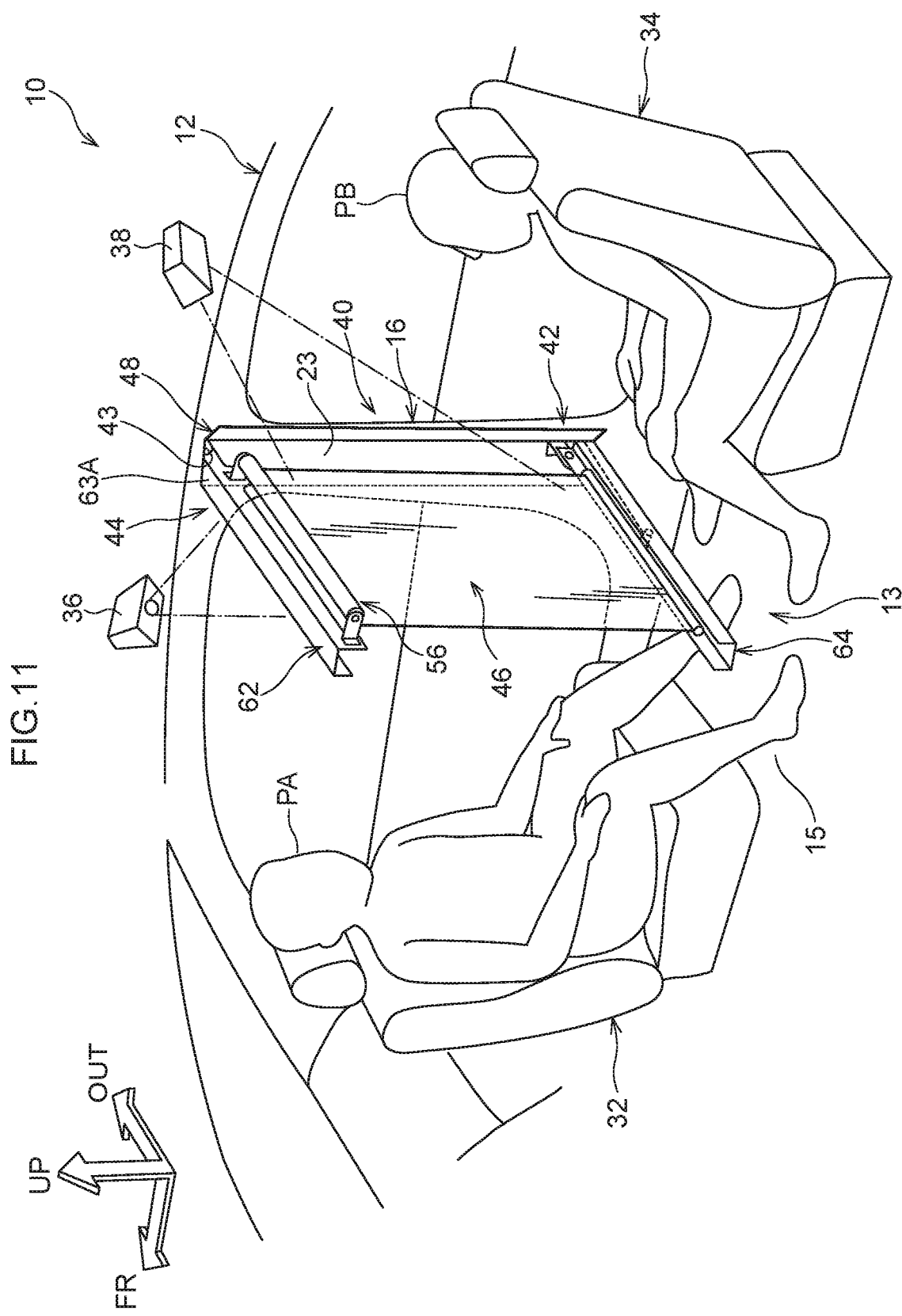
FIG. 11 is a configuration diagram illustrating a vehicle cabin interior in a deployed state of the screen member illustrated in FIG. 4.

As illustrated in FIG. 11, in the deployed state of the screen member 46, an image is projected onto the front face of the screen member 46 by the first projector 36. The image on the front face is seen by the occupant PA sitting in the front seat 32. An image is projected onto the back face of the screen member 46 by the second projector 38. The image on the back face is seen by the occupant PB sitting in the rear seat 34. If, for example, the same image is projected onto both the front face and the back face of the screen member 46, the occupant PA and the occupant PB are able to hold discussions while looking at the same image.

Note that FIG. 11 illustrates, a state in which the opening-closing door 48 has been opened wide in order to facilitate understanding of the placement state of the channel member 44. In reality, the opening, amount of the opening-closing door 48 is smaller than it appears in FIG. 11. The placement of the opening-closing door 48 is set in advance such that its movement is not restricted by contact with the screen member 46 and the like when the opening-closing door 48 moves to close off the opening 43.

Next, when the occupant PA operates a non-illustrated button of the operation panel 31 illustrated in FIG. 3, projection onto the screen member 46 ends and an operation to house the screen member 46 begins.

The screen member 46 illustrated in FIG. 4 is taken up by the take-up section 56. The drive sections 52 (see FIG. 5) are then driven such that the first channel member 62 and the second channel member 64 are operated in the opposite directions to when being operated so as to project into the vehicle cabin 15, and are housed in the housing section 23 of the center pillar 16. A portion of the opening 43 is closed off by the opening-closing door 48 as illustrated in FIG. 6 and FIG. 7.

As described above, in the interior structure 40 illustrated in FIG. 1 to FIG. 11, the channel member 44 moves toward the vehicle cabin 15 through the opening 43. The screen member 46 is deployed in the vehicle cabin 15 in a state in which the channel member 44 has moved into the vehicle cabin 15. Note that the housing section 23 is formed on the opposite side to the vehicle cabin 15. Namely, since the housing section 23 does not project into the vehicle cabin 15, the housing section 23 that houses the screen member 46 which is used in the vehicle cabin 15 can be suppressed from imparting a claustrophobic sensation to occupants P when the screen member 46 is in the non-deployed state.

In the interior structure 40, at least a portion of the opening 43 is covered by the opening-closing door 48, enabling the channel member 44 and the screen member 46 to be suppressed from being seen by the occupants P when in a housed state.

In the interior structure 40, the drive section 52 drives the channel member 44 toward either the housing section 23 or the vehicle cabin 15. The movement direction of the channel member 44 is thus less likely to waver than in a configuration in which an occupant P holds and moves the channel member 44 by hand, enabling the position of the channel member 44 in the vehicle cabin 15 to be stabilized.

In addition, in the interior structure 40, the first channel member 62 is moved toward the upper side in the vehicle cabin 15, and the second channel member 64 is moved toward the lower side in the vehicle cabin 15, such that the screen member 46 is exposed in the vehicle cabin 15 in the non-deployed state. The thus exposed screen member 46 is pulled from the first channel member 62 toward the second channel member 64 by the pull-out section 54 in order to deploy (stretch out) the screen member 46 between the first channel member 62 and the second channel member 64. The second channel member 64 can also be utilized to suppress positional misalignment of part of the screen member 46. This enables swaying of the screen member 46 when in the deployed state to be suppressed.

In the interior structure 40, the pull-out section 54 pulls the screen member 46 from the first channel member 62 toward the second channel member 64, thereby retaining the screen member 46 in a stretched-out state. This thereby enables flexing of the screen member 46 when in the deployed state to be suppressed.

In the interior structure 40, as an example, using the screen member 46 as a blind between the occupant PA and the occupant PB without performing projection onto the screen member 46 makes the interior of the vehicle cabin 15 more conducive to relaxation.

Second Exemplary Embodiment

Explanation follows regarding an interior structure 120 as an example of a vehicle interior structure according to a second exemplary embodiment. The interior structure 120 is provided at the vehicle 10 in place of the interior structure 40 (see FIG. 1) of the first exemplary embodiment. Note that members and locations that are basically the same as those of the interior structure 40 are allocated the same reference numerals as in the interior structure 40, and explanation thereof is omitted.

Figure 12:
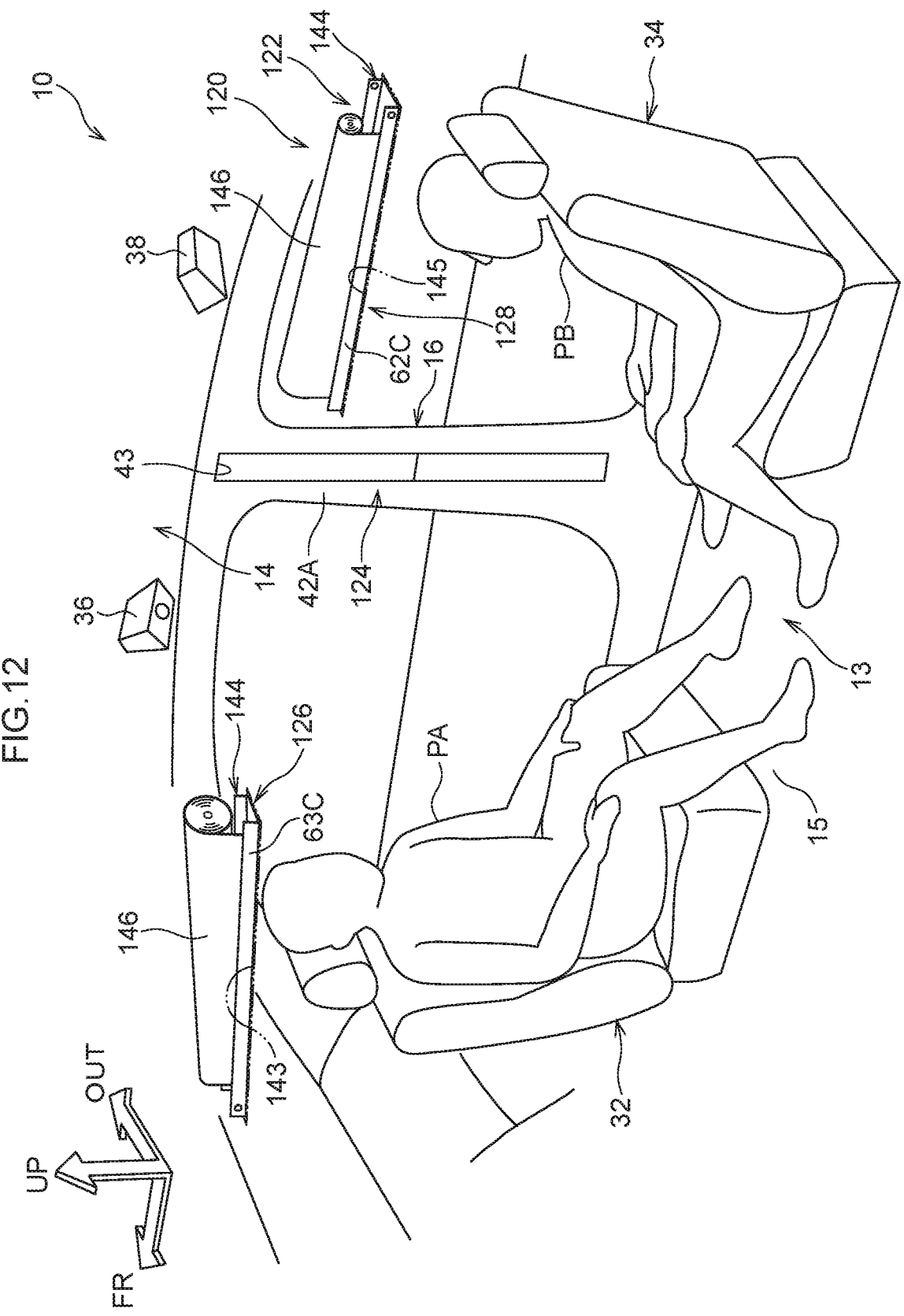
FIG. 12 is a configuration diagram illustrating an interior structure according to a second exemplary embodiment.

As an example, the interior structure 120 illustrated in FIG. 12 includes an upper interior structure 122 provided in the roof section 14 and a side interior structure 124 provided in the center pillar 16. Note that the center pillar 16 is not provided with the opening-closing door 48 (see FIG. 2). The vehicle front-rear direction width of the opening 43 is narrower than the vehicle front-rear direction width of the opening 43 (see FIG. 2) of the first exemplary embodiment. In FIG. 12, illustration of configurations in the roof section 14 other than the upper interior structure 122 and the side interior structure 124 is omitted.

Upper interior Structure

The upper interior structure 122 includes a front interior structure 126 and a rear interior structure 128.

Figure 13:
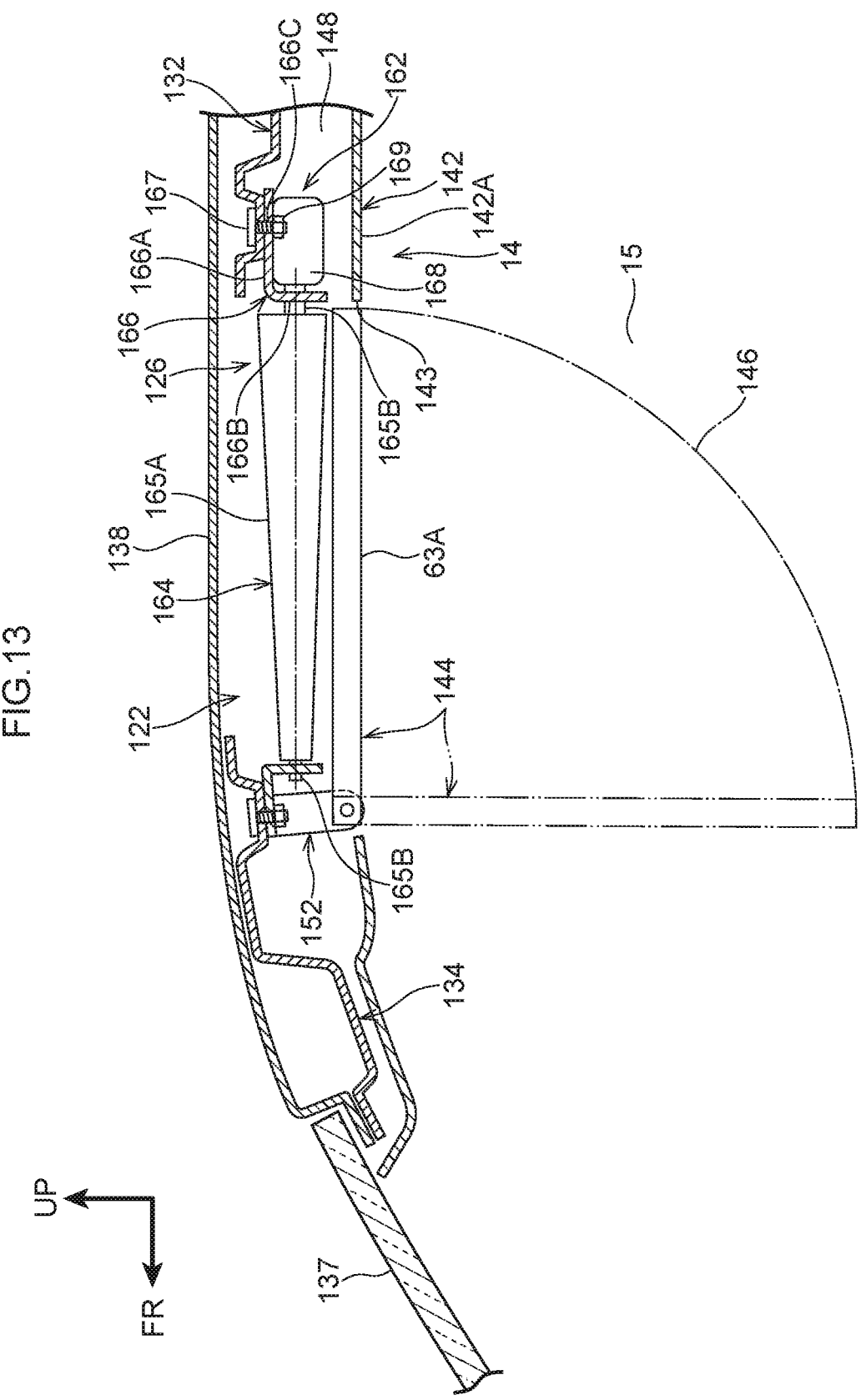
FIG. 13 is a vertical cross-section illustrating a configuration of a vehicle front side section of the interior structure illustrated in FIG. 12.
Figure 14:
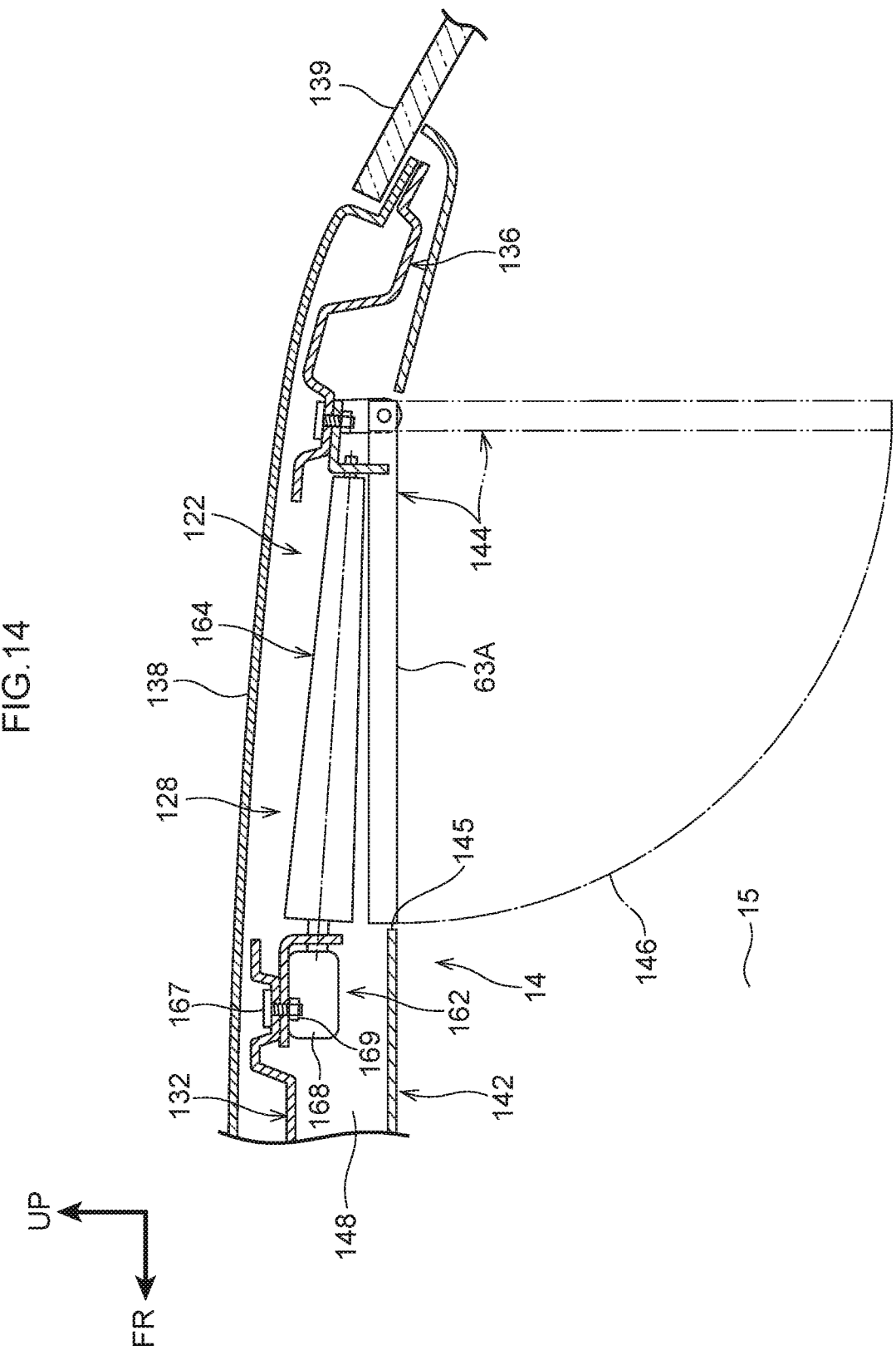
FIG. 14 is a vertical cross-section illustrating a configuration of a vehicle rear side section of the interior structure illustrated in FIG. 12.

The roof section 14 illustrated in FIG. 13 and FIG. 14 is configured including roof reinforcement 132, a roof front header 134 (see FIG. 13), a roof rear header 136 (see FIG. 14), a roof panel 138, and a roof headlining 142, described later. The roof reinforcement 132, the roof front header 134, and the roof rear header 136 are members that extend along the vehicle width direction, and are each joined to the roof-side rail 21 (see FIG. 2) through non-illustrated brackets.

Note that in FIG. 13 and FIG. 14, some joining locations and fastening locations between the respective members are omitted from illustration. A front windshield glass 137 is provided at the vehicle front side of the roof panel 138. A rear windshield glass 139 is provided at the vehicle rear side of the roof panel 138.

Front Interior Structure

The front interior structure 126 illustrated in FIG. 13 includes the roof headlining 142 serving as an example of a vehicle interior member, channel members 144, each serving as an example of a moving member, and a curtain 146 serving as an example of a curtain member. The front interior structure 126 is also provided with a take-up section 162. The channel members 144, the curtain 146, and the take-up section 162 are housed in a housing section 148, described later.

Roof Headlining

The roof headlining 142 extends along the vehicle front-rear direction and the vehicle width direction at a lower end portion of the roof section 14. The roof headlining 142 is formed with an opening 143 and an opening 145 (see FIG. 14) penetrating toward the vehicle cabin 15 in the vehicle vertical direction. A face on the vehicle cabin 15 side of the roof headlining 142 is referred to as a lower face 142A.

As an example, the opening 143 is formed at a location at the vehicle width direction center and vehicle front-rear direction front side of the roof headlining 142. The opening 143 has a rectangular shape that is long in the vehicle front-rear direction and short in the vehicle width direction.

As an example, the opening 145 illustrated in FIG. 14 is formed at a location at the vehicle width direction center and vehicle front-rear direction rear side of the roof headlining 142. The opening 145 has a rectangular shape that is long in the vehicle front-rear direction and short in the vehicle width direction.

In the roof section 14, the housing section 148 serving as a space is formed between the roof panel 138 and the roof headlining 142. The housing section 148 is in communication with the interior of the vehicle cabin 15 through the opening 143 (see FIG. 13) and the opening 145. The roof headlining 142 is thus integral with the roof section 14, with the opening 143 and the opening 145 being formed facing the vehicle cabin 15 and the hollow housing section 148 being formed on the opposite side of the roof headlining 142 to the vehicle cabin 15.

Channel Member

As an example, the channel member 144 illustrated in FIG. 13 is a member with a similar shape and similar length to the first channel member 62 described above (see FIG. 4). The channel member 144 includes a support bracket 152 that supports the channel member 144. The channel member 144 is provided in the roof section 14 so as to be capable of being housed in the housing section 148 and be capable of moving toward the vehicle cabin 15 through the opening 143.

Figure 15:
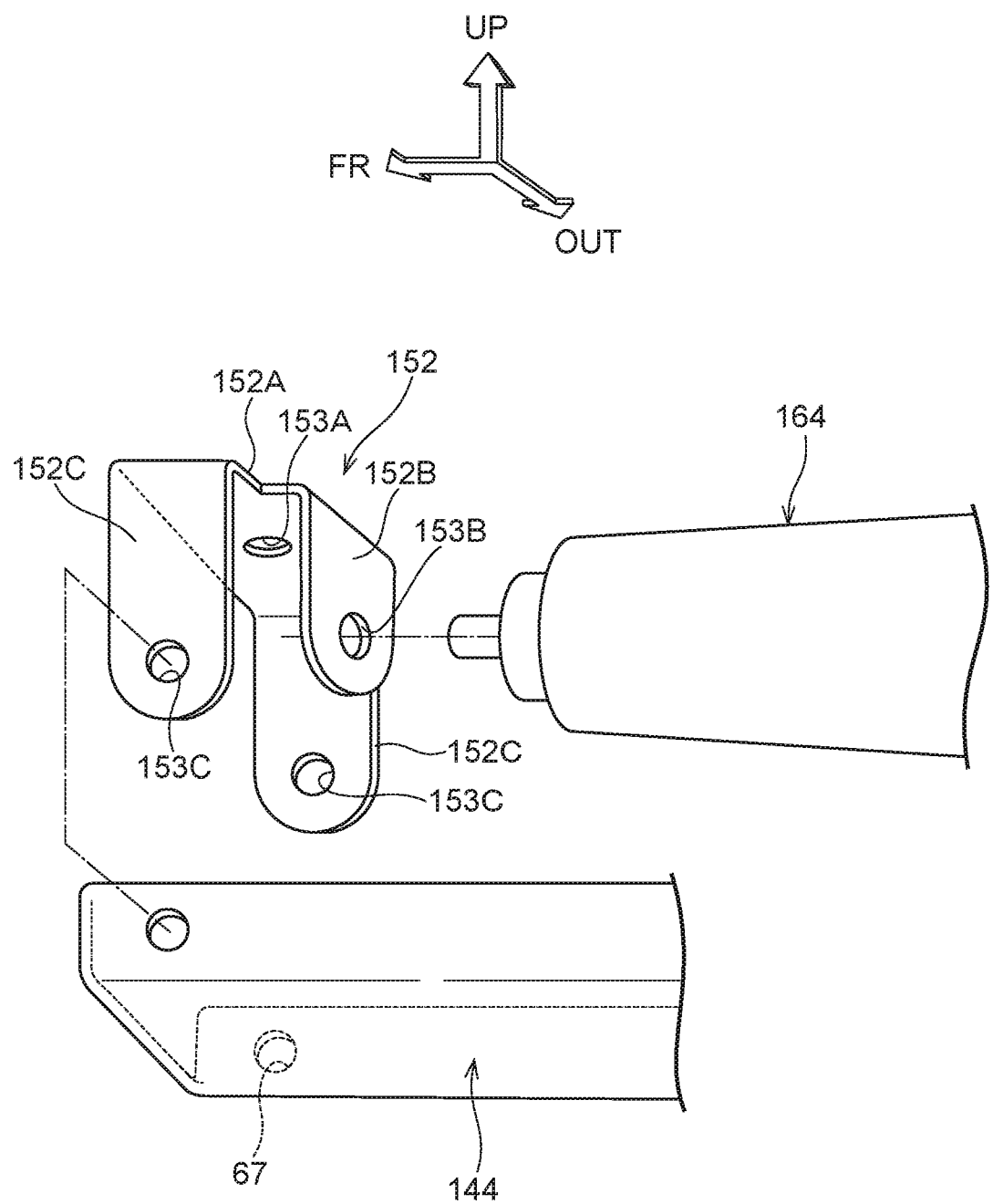
FIG. 15 is an enlarged partial perspective view illustrating parts of a channel member, a bracket, and a roller member of the interior structure illustrated in FIG. 12.

As illustrated in FIG. 15, as an example, the support bracket 152 is formed by bending a T-shaped plate member (as viewed along the vehicle vertical direction) at three locations. Specifically, the support bracket 152 includes an upper wall 152A, a support wall 152B, and two side walls 152C. An attachment hole 153A penetrating in the vehicle vertical direction is formed through the upper wall 152A. A support hole 153B penetrating in the vehicle front-rear direction is formed through the support wall 152B. A non-illustrated shaft bearing member is provided in the support hole 153B. A coupling hole 153C penetrating in the vehicle width direction is formed through each of the two side walls 152C.

Figure 16:
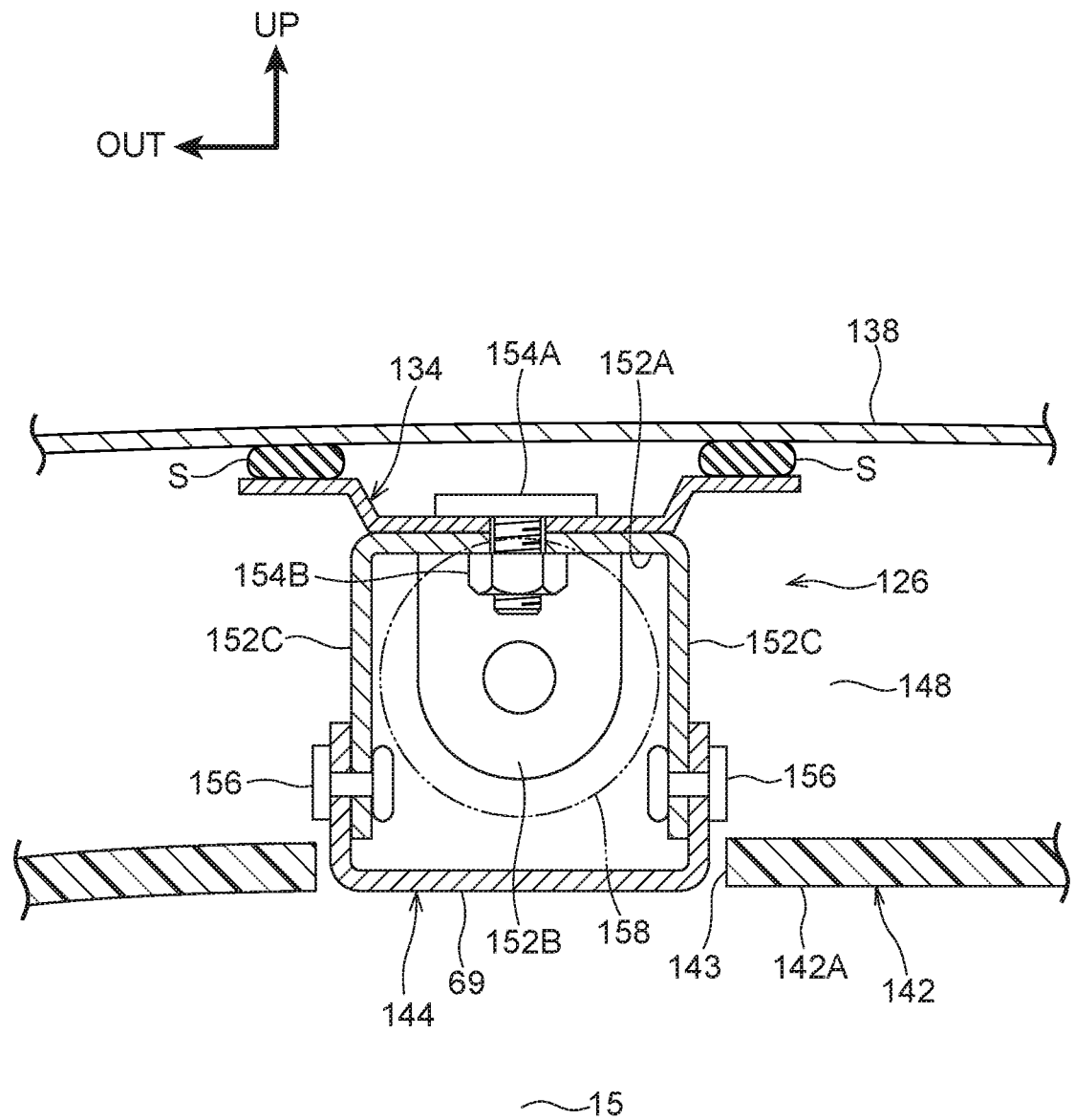
FIG. 16 is an enlarged partial vertical cross-section illustrating parts of a channel member, a bracket, and a roller member of the interior structure illustrated in FIG. 12.

As illustrated in FIG. 16, the upper wall 152A is fastened to the roof front header 134 using a stud bolt 154A and a nut 154B. One end portion of the channel member 144 is coupled to the two side walls 152C using coupling pins 156 with their axial directions in the vehicle width direction. The channel member 144 is thus capable of pivoting about the coupling pins 156 through the opening 143 from the housing section 148 toward the vehicle cabin 15. The support wall 152B rotatably supports a roller member 158, described later, through the non-illustrated shaft bearing member. The roof front header 134 is affixed to the roof panel 138 using an adhesive S.

In a housed state of the channel member 144 in the housing section 148, a front face 69 of the channel member 144 and the lower face 142A of the roof headlining 142 lie in a single plane running along the vehicle width direction (are disposed with substantially no step between each other).

As illustrated in FIG. 13, in a state in which the channel member 144 is housed in the housing section 148, the channel member 144 is disposed with its axial direction running in the vehicle front-rear direction. Since a front end portion of the channel member 144 is coupled to the support bracket 152 so as to be capable of pivoting, a rear end portion of the channel member 144 pivots so as to move in a circular arc shaped trajectory. In a state in which the channel member 144 has moved through the opening 143 into the vehicle cabin 15, the channel member 144 is disposed with its axial direction running in the vehicle vertical direction.

Partitioning Member

The curtain 146 illustrated in FIG. 12 is configured by a fabric member that has a substantially oriental fan shape when in a deployed state, radial direction length of the curtain 146 is shorter than the axial direction length of the channel member 144. One circumferential direction end portion of the curtain 146 is attached to an outer peripheral face of a roller member 164, described later (see FIG. 13). The other circumferential direction end portion of the curtain 146 is attached to a side portion 63C of the channel member 144.

The curtain 146 illustrated in FIG. 13 is housed in the housing section 148 when in a non-deployed state. The non-deployed state of the curtain 146 refers to a state in which the curtain 146 has been taken up by the take-up section 162, described later. A deployed state of the curtain 146 refers to a state in which the curtain 146 has been pulled out from the take-up section 162 due to the channel member 144 moving into the vehicle cabin 15, and the curtain 146 is disposed along the vehicle front-rear direction and vehicle vertical direction (deployed in a substantially oriental fan shape).

Take-Up Section

As an example, the take-up section 162 includes the roller member 164, a bracket 166 that rotatably supports another end portion of the roller member 164, and a motor 168 that rotates the roller member 164.

The roller member 164 includes a rolled-up body 165A formed in a truncated circular conical shape, and a shaft 165B that projects from both axial direction end portions of the rolled-up body 165A toward the outer sides. The rolled-up body 165A is disposed with its axial direction running in the vehicle front-rear direction. The side of the rolled-up body 165A with the smaller radius is disposed at the vehicle front side.

The bracket 166 is configured by bending a metal plate member into an L-shape, and includes an attachment portion 166A and a support portion 166B. A through hole 166C penetrating in the vehicle vertical direction is formed through the attachment portion 166A. The attachment portion 166A is attached to the roof reinforcement 132 described above using a stud bold 167 and a nut 169. A non-illustrated through bole penetrating in the vehicle front-rear direction is formed through the support portion 166B. The shaft 165B is inserted into this through hole. The roller member 164 is thus rotatably supported by the bracket 166 and the support bracket 152.

A non-illustrated gear is fixed to an end portion of the shaft 165B. The motor 168 is fixed to the bracket 166, and rotates the non-illustrated gear of the shaft 165B to rotate the roller member 164. The motor 168 is capable of rotating in both a direction to feed out the curtain 146 into the vehicle cabin 15 and a direction to take up the curtain 146. The ECU 20 (see FIG. 3) controls drive of the motor 168.

Since the curtain 146 is connected between the channel member 144 and the roller member 164, when the curtain 146 is fed out toward the vehicle cabin 15, the channel member 144 moves into the vehicle cabin 15. In other words, the curtain 146 is deployed in the vehicle cabin 15 accompanying movement of the channel member 144 toward the vehicle cabin 15. The channel member 144 is housed in the housing section 148 by taking up the curtain 146 onto the roller member 164.

Rear Interior Structure

As an example, the rear interior structure 128 illustrated in FIG. 14 is provided on a rear side so as to be symmetrical to the front interior structure 126 (see FIG. 13) about the vehicle front-rear direction center of the vehicle cabin 15 interior. The configuration of the rear interior structure 128 is similar to the configuration of the front interior structure 126 with the exception of the different placement orientations. Accordingly, configurations that are similar to those of the front interior structure 126 with the exception of the placement orientation are allocated the same reference numerals as in the front interior structure 126, and explanation thereof is omitted.

Namely, the rear interior structure 128 includes the roof headlining 142, a channel member 144, and a curtain 146. The rear interior structure 128 is also provided with a take-up section 162. The channel member 144, the curtain 146, and the take-up section 162 are housed in the housing section 148.

Side Interior Structure

Figure 17:
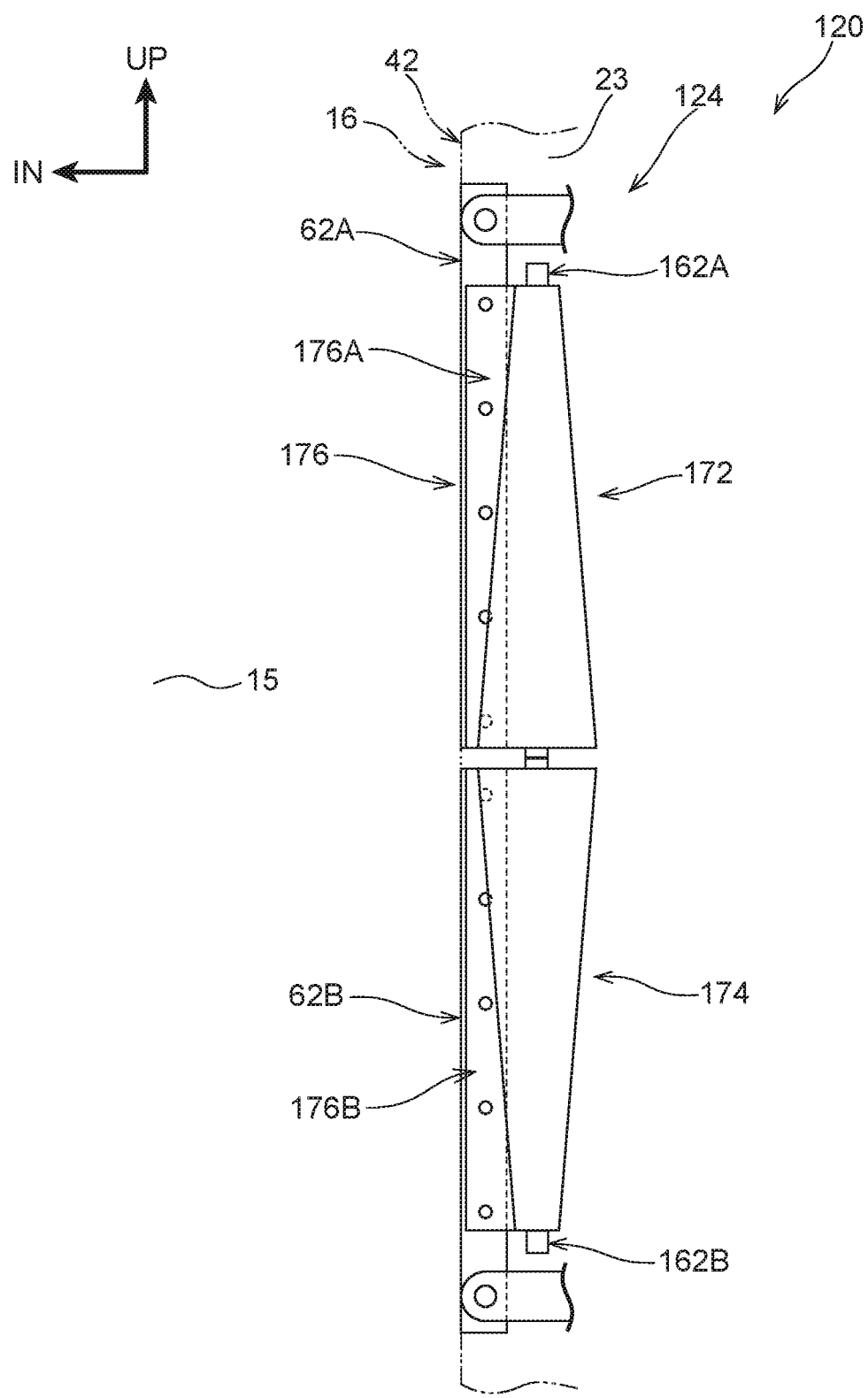
FIG. 17 is a configuration diagram illustrating a housed state of channel members of the interior structure illustrated in FIG. 12.
Figure 18:
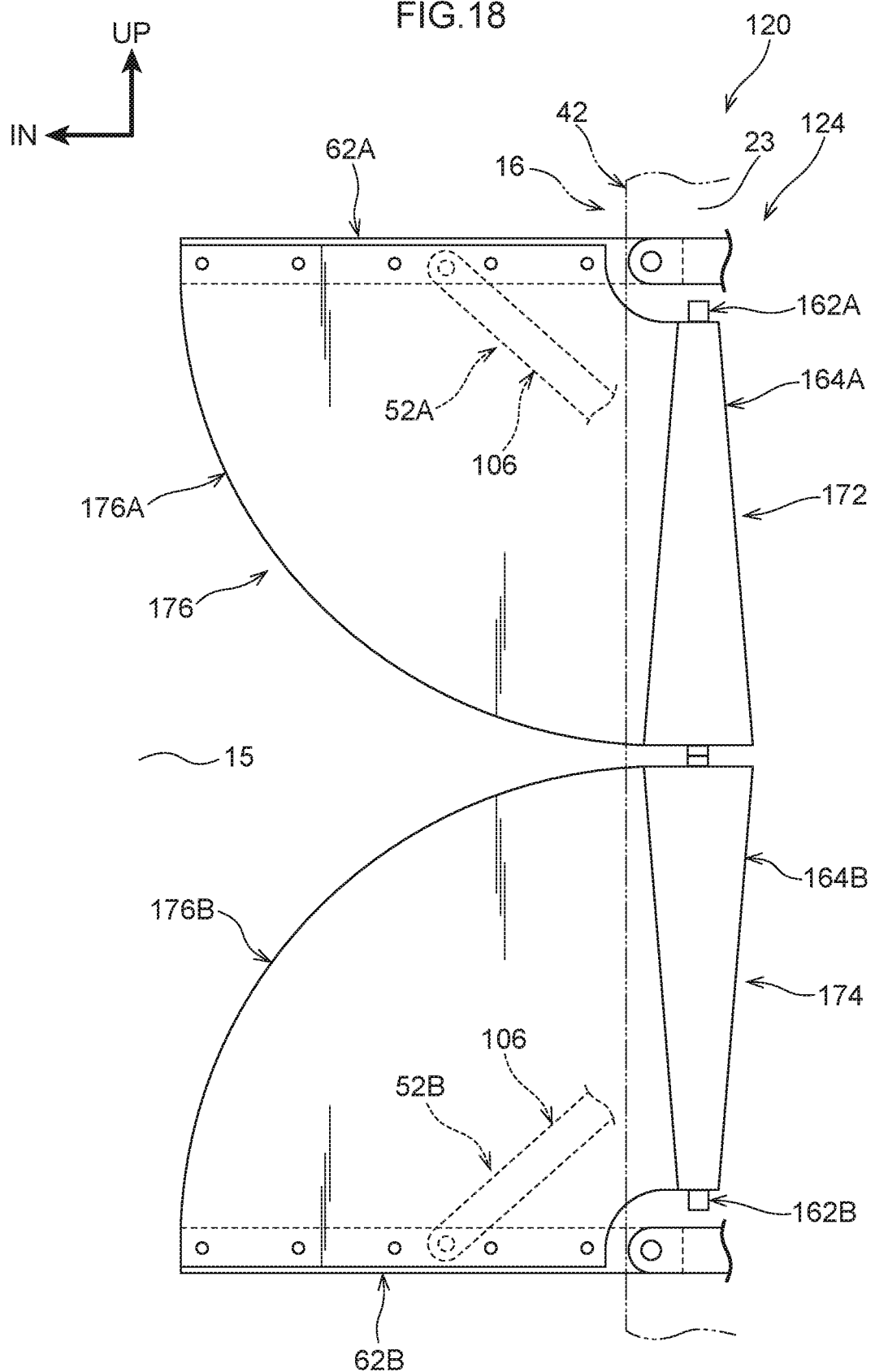
FIG. 18 is a configuration diagram illustrating a deployed state of channel members of the interior structure illustrated in FIG. 12.

The side interior structure 124 illustrated in FIG. 17 and FIG. 18 includes an upper interior structure 172 and a lower interior structure 174, aligned with each other in the vehicle vertical direction. Note that the configurations similar to those of the interior structure 40 (see FIG. 4) and the upper interior structure 122 (see FIG. 17) described above are allocated the same reference numerals as those of the interior structure 40 and upper interior structure 122 and explanation, thereof is omitted. In FIG. 17 and FIG. 18, some members including brackets and the like are omitted from illustration.

The upper interior structure 172 and the lower interior structure 174 are, as an example, provided symmetrically to each other about the vehicle vertical direction center of the center pillar 16. Namely, the configuration of the lower interior structure 174 is similar to the configuration of the upper interior structure 172 with the exception of the different placement orientation. Accordingly, in the following explanation, reference numerals of the various members of the upper interior structure 172 are suffixed with the letter A, and reference numerals of the various members of the lower interior structure 174 are suffixed with the letter B in order to distinguish between the upper interior structure 172 and the lower interior structure 174.

Upper Interior Structure

As an example, the upper interior, structure 172 includes the pillar garnish 42, a first channel member 62A serving as an example of an upper member, a partitioning member 176A serving as an example of an upper curtain member, a take-up section 162A, and a drive section 52A (see FIG. 18). As an example, the partitioning member 176A has substantially the same configuration as the curtain 146 (see FIG. 12), but differs from the curtain 146 in the point that a front face and a back face are each formed with a projection target portion that can be projected onto.

One circumferential direction end portion of the partitioning member 176A is attached to the first channel member 62A. The other circumferential direction end portion of the partitioning member 176A is attached to a roller member 164A (see FIG. 18). The partitioning member 176A is deployed into the vehicle cabin 15 from the take-up section 162A accompanying movement of the first channel member 62A toward the upper side inside the vehicle cabin 15 by driving the drive section 52A (a link member 106 (see FIG. 18)). Note that the roller member 164A is capable of rotating freely during deployment of the partitioning member 176A.

From the vehicle cabin 15, the partitioning member 176A is housed in the housing section 23 by the take-up section 162A rotating the roller member 164A accompanying movement of the first channel member 62A toward the housing section 23. When in a deployed state, the partitioning member 176A is disposed facing the upper bodies of the occupant PA and the occupant PB (see FIG. 12) in the vehicle front-rear direction.

Lower Interior Structure

As an example, the lower interior structure 174 includes the pillar garnish 42, a first channel member 62B serving as an example of a lower member, a partitioning member 176B serving as an example of a lower curtain member, a take-up section 162B, and a drive section 52B (see FIG. 18). As an example, the partitioning member 176B is configured similarly to the curtain 146 (see FIG. 12). The partitioning member 176A and the partitioning member 176B are collectively referred to as fabric members 176. The fabric members 176 are an example of a curtain member.

One circumferential direction end portion of the partitioning member 176B is attached to the first channel member 62B, and the other circumferential direction end portion of the partitioning member 176B is attached to a roller member 164B (see FIG. 18). The partitioning member 176B is deployed into the vehicle cabin 15 from the take-up section 162B accompanying movement of the first channel member 62B toward the lower side inside the vehicle cabin 15 by driving the drive section 52B (a link member 106 (see FIG. 18)). Note that the roller member 164B is capable of rotating freely during deployment of the partitioning member 176B.

From the vehicle cabin 15, the partitioning member 176B is housed in the housing section 23 by the take-up section 162B rotating the roller member 164B accompanying movement of the first channel member 62B toward the housing section 23. In a deployed state, the partitioning member 176B is disposed facing the lower bodies of the occupant PA and the occupant PB (see FIG. 12) in the vehicle front-rear direction.

Operation and Effects

Explanation follows regarding operation and effects of the interior structure 120 of the second exemplary embodiment.

As illustrated in FIG. 13 and FIG. 14, in a housed state of the respective channel members 144, the base portion 63A and the roof headlining 142 are in a state lying in a single plane running along the vehicle front-rear direction. In the housed state of the first channel member 62A and the first channel member 62B, the base portion 63A and the vertical wall 42A (see FIG. 12) are in a state disposed in a single plane running along the vehicle front-rear direction. Accordingly, the occupant PA and the occupant PB inside the vehicle cabin 15 illustrated in FIG. 12 are aware of the center pillar 16 and the roof headlining 142 (see FIG. 13), but are not aware of the housing section 23 (see FIG. 17) or the housing section 148 (see FIG. 13). Namely, the housing section 23 and the housing section 148 are suppressed from imparting a claustrophobic sensation to the occupant PA and the occupant PB.

Note that the respective members are deployed by the occupant PA or the occupant. PB pressing a non-illustrated button on the operation panel 31 (see FIG. 3) when the respective members are in their housed states.

As illustrated in FIG. 13 and FIG. 14, the take-up sections 162 in the roof section 14 are driven in a feed-out direction to pivot the respective channel members 144 such that they project inside the vehicle cabin 15. When this is performed, the respective curtains 146 are deployed into the vehicle cabin 15 as the channel members 144 project out. A space in a vehicle front side section inside the vehicle cabin 15 is partitioned into a driving seat side and a front passenger seat side by the curtain 146 on the vehicle front side. A space in a vehicle rear side section inside the vehicle cabin 15 is partitioned into a right side and a left side by the curtain 146 on the vehicle rear side. Inside the vehicle cabin 15, the activity of the occupant PA and the occupant PB sitting on the right side is thus hidden from the view of non-illustrated occupants sitting on the left side, allowing the occupant PA and the occupant PB to relax. For example, this enables the privacy of occupants to be protected in cases in which strangers are sharing a rideshare.

As illustrated, in FIG. 17 and FIG. 8, driving the drive section 52A and the drive section 52B in the center pillar 16 pivots the first channel member 62A and the first channel member 62B so as to project inside the vehicle cabin 15. When this is performed, the partitioning member 176A and the partitioning member 176B are deployed into the vehicle cabin 15 as the first channel member 62A and the first channel member 62B project out.

Figure 19:
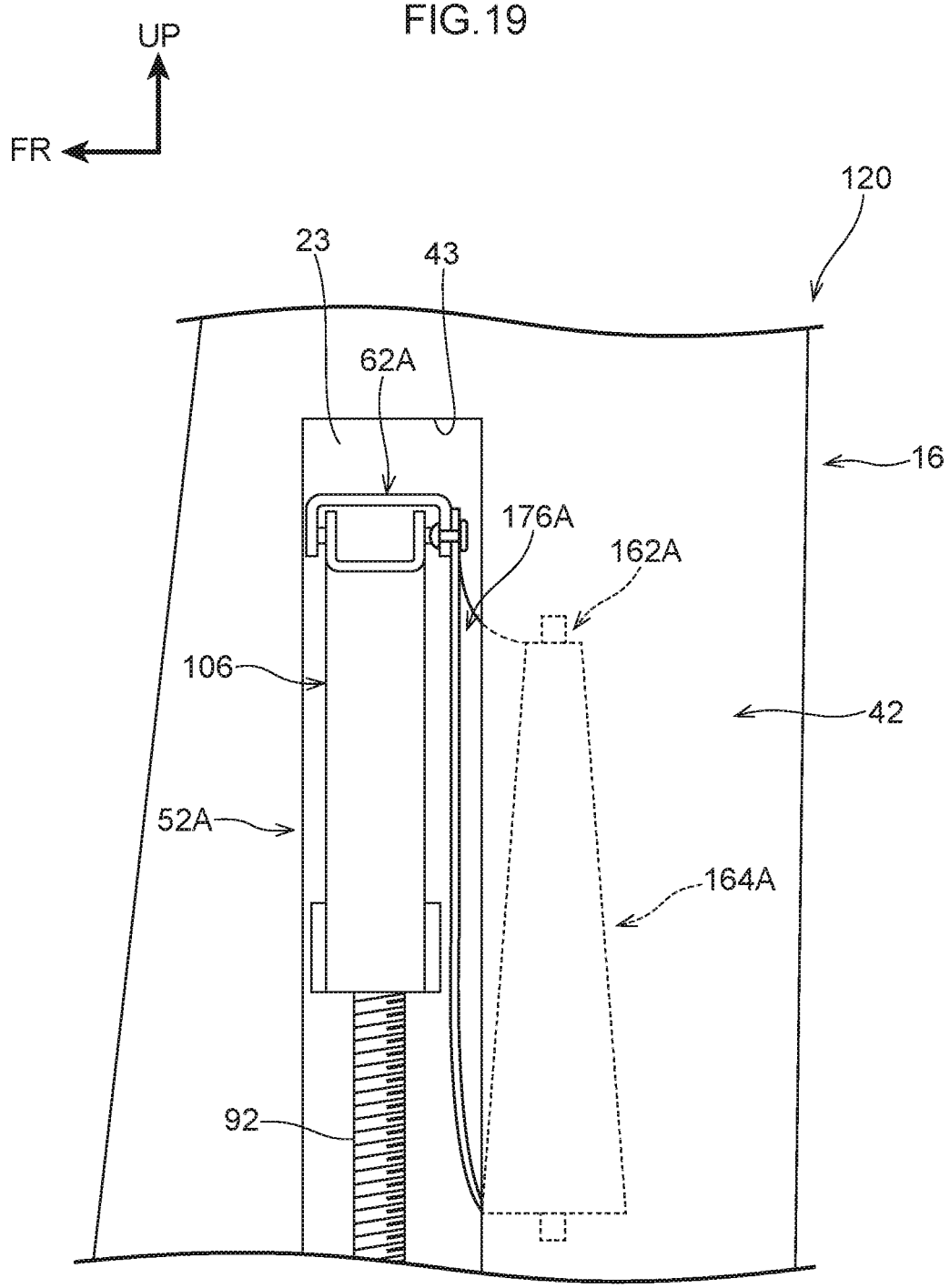
FIG. 19 is a side view illustrating a deployed state of a channel member of the interior structure illustrated in FIG. 12 as viewed along the vehicle width direction.

As illustrated in FIG. 19, when the first channel member 62A in a projecting state is viewed along the vehicle width direction, the take-up section 162A is covered by the pillar garnish 42. Dust from inside the vehicle cabin 15 is thus suppressed from entering the take-up section 162A in comparison to configurations in which the take-up section 162A is exposed. Note that similar also applies on the first channel member 62B side (see FIG. 17).

Figure 20:
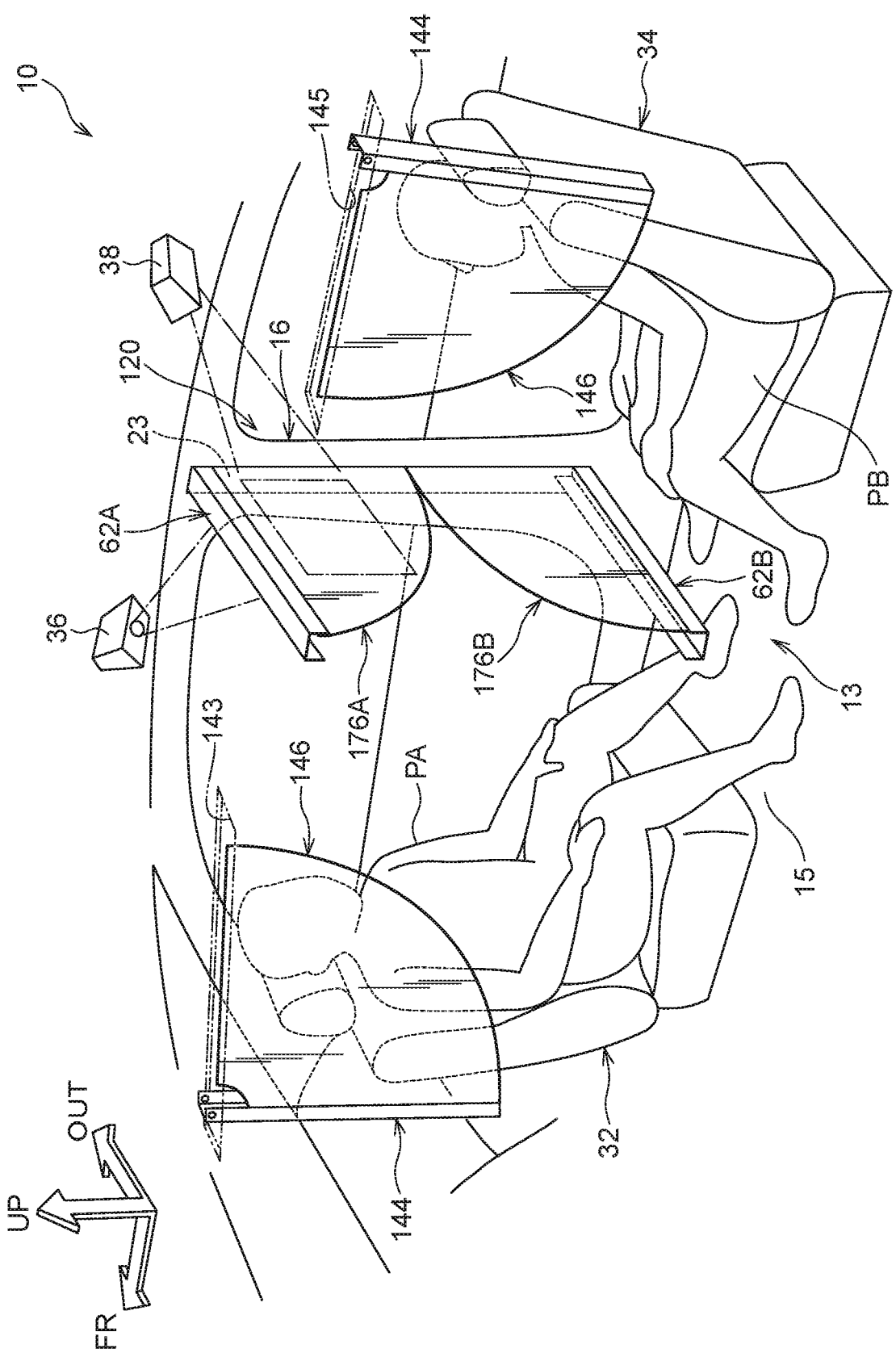
FIG. 20 is a configuration diagram illustrating a deployed state of respective channel members of the interior structure illustrated in FIG. 1.

As illustrated in FIG. 20, part of the space inside the vehicle cabin 15 is partitioned into a front seat side and a rear seat side by the partitioning member 176A and the partitioning member 176B.

An image is projected onto the front face of the partitioning member 176A by the first projector 36. The image on the front face is seen by the occupant PA sitting in the front seat 32. An image is projected onto the back face of the partitioning member 176A by the second projector 38. The image on the back face is seen by the occupant PB sitting in the rear seat 34. Note that part of the front face of the partitioning member 176A overlaps with the link member 106 (see FIG. 18) in the vehicle front-rear direction. The placement of the image on the front face side of the partitioning member 176A may therefore be offset toward an oblique lower side the central side of the vehicle cabin 15) in advance.

The partitioning member 176B is disposed between the feet of the occupant PA in the front seat and the feet of the occupant PB in the rear seat. Thus, for example, if the occupant PA crosses their legs, due to being conscious of the partitioning member 176B, the occupant PA will keep their toes at the front side of the partitioning member 176B. In other words, since the toes of the occupant PA are not placed at the rear side of the partitioning member 176B (on the occupant PB side), it is possible to suppress annoyance caused to the occupant PB. It is likewise possible to suppress annoyance caused to the occupant PA if the occupant PB crosses their legs.

The drive section 52A and the drive section 52B (see FIG. 18) are driven when projection onto the partitioning member 176A has ended. The first channel member 62A and the first channel member 62B are thus housed in the housing section 23 of the center pillar 16 by the reverse operation to the operation to cause the first channel member 62A and the first channel member 62B to project inside the vehicle cabin 15. Namely, the partitioning member 176A and the partitioning member 176B are housed in the housing section 23.

If the curtain 146 is no longer required, the occupant PA or the occupant PB operate a non-illustrated button on the operation panel 31 (see FIG. 3) to start an operation to take up the curtain 146 with the take-up section 162 (see FIG. 13). The corresponding channel member 144 is thereby housed in the housing section 148 by the reverse operation to the operation to cause the housing section 148 to project inside the vehicle cabin 15.

As described above, in the interior structure 120, the housing section 23 and the housing section 148 (see FIG. 13) do not project inside the vehicle cabin 15. The housing section 148 and the housing section 23 are thus capable of suppressing a claustrophobic sensation from being imparted to the occupants P in a non-deployed state of the curtains 146 and a non-deployed state of the partitioning member 176A and partitioning member 176B.

In the interior structure 120, the drive sections 52 drive the first channel member 62A and the first channel member 62B toward the housing section 23. The movement directions of the first channel member 62A and the first channel member 62B are thus less likely to waver than in a configuration in which an occupant P holds and moves the first channel member 62A and the first channel member 62B by hand. This enables the positions of the first channel member 62A and the first channel member 62B inside the vehicle cabin 15 to be stabilized.

In the interior structure 120, the partitioning member 176A is disposed at the upper side inside the vehicle cabin 15 so as to divide the upper side inside the vehicle cabin 15 into two spaces in the vehicle front-rear direction, and such that the partitioning member 176A can easily be seen by the occupant PA and the occupant PB. The partitioning member 176B is disposed at the lower side inside the vehicle cabin 15 so as to divide a lower section inside the vehicle cabin 15 into two spaces in the vehicle front-rear direction. The partitioning member 176B is less visible to the occupant PA and the occupant PB than the partitioning member 176A. The partitioning member 176A is employed as a screen for viewing images. The partitioning member 176B is employed as a partitioning wall to partition the front seat 32 from the rear seat 34. Namely, dividing the interior structure 120 into upper and lower parts enables the partitioning member 176A and the partitioning member 176B to be utilized for different purposes.

Note that the partitioning member 176B may be deployed on its own without deploying the partitioning member 176A. If the occupant PA and the occupant PB are conversing while sitting facing each other, their lower bodies can be hidden from each other by the partitioning member 176B such that the attention is drawn to the upper bodies, facilitating conversation. Since their lower bodies are hidden, the occupant PA and the occupant PB can adopt a more at-ease posture, for example stretching out their legs.

MODIFIED EXAMPLES

The present disclosure is not limited to the exemplary embodiments described above. In the following modified examples, configurations similar to those of the interior structure 40 and the interior structure 120 are allocated the same reference numerals as in the interior structure 40 and the interior structure 120, and explanation thereof is omitted.

First Modified Example

Figure 21:
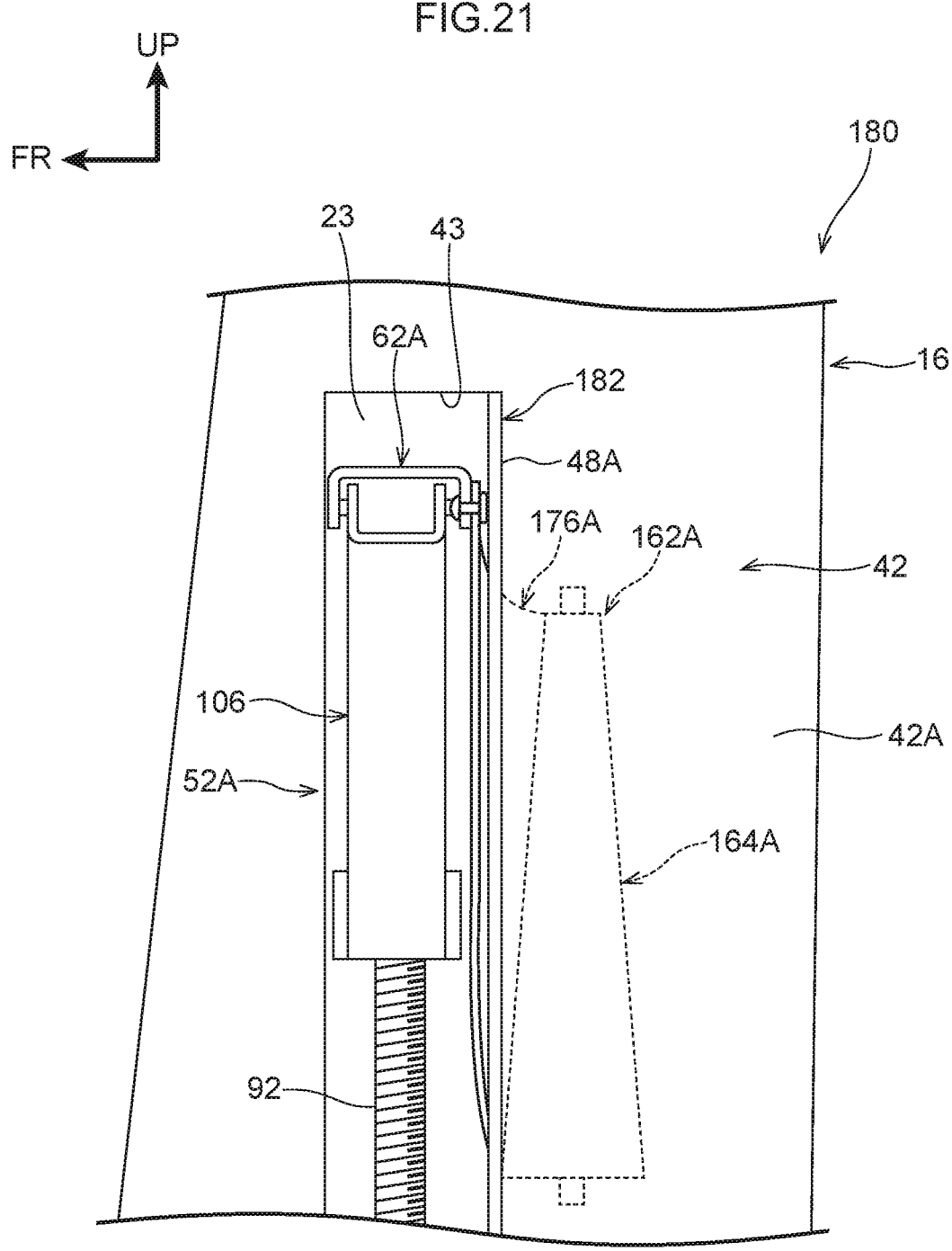
FIG. 21 is a configuration diagram illustrating an interior structure according to a first modified example.

FIG. 21 illustrates an interior structure 180 as a first modified example of a vehicle interior structure. The interior structure 180 is a structure in which the opening 43 of the interior structure 120 (see FIG. 19) is provided with an opening-closing door 182 as an example of an opening-closing member. The opening-closing door 182 is capable of opening and closing the opening 43 on the vehicle cabin 15 side of the first channel member 62A and the first channel member 62B (see FIG. 17) in the housing section 23.

As an example, the configuration of the opening-closing door 182 is similar to the configuration of the opening-closing door 48 (see FIG. 6) with the exception of its size. The size of the opening-closing door 182 is a sufficient size to cover the opening 43 as viewed along the vehicle width direction. As viewed along, the vehicle width direction, the opening-closing door 182 is configured to pivot about its vehicle front-rear direction rear side, and the front side of the opening-closing door 182 is configured so as to move toward the vehicle cabin 15.

The opening-closing door 182 is biased toward a side to close off the opening 43 by a non-illustrated torsion spring. In a closed-off state of the opening-closing door 182, as an example, the flat plate portion 48A and the vertical wall 42A are in a state disposed in a single plane running along the vehicle from rear direction. The opening-closing door 182 is placed in an open state by moving the first channel member 62A and the first channel member 62B (see FIG. 17) into the vehicle cabin 15. The opening-closing door 182 is placed in the closed-off state by moving the first channel member 62A and the first channel member 62B inside the housing section 23. In this manner, the opening-closing door 182 is capable of opening and closing the overall opening 43, making the housing section 23 less visible to the occupant PA and the occupant PB when in the closed-off state.

Second Modified Example

Figure 22:
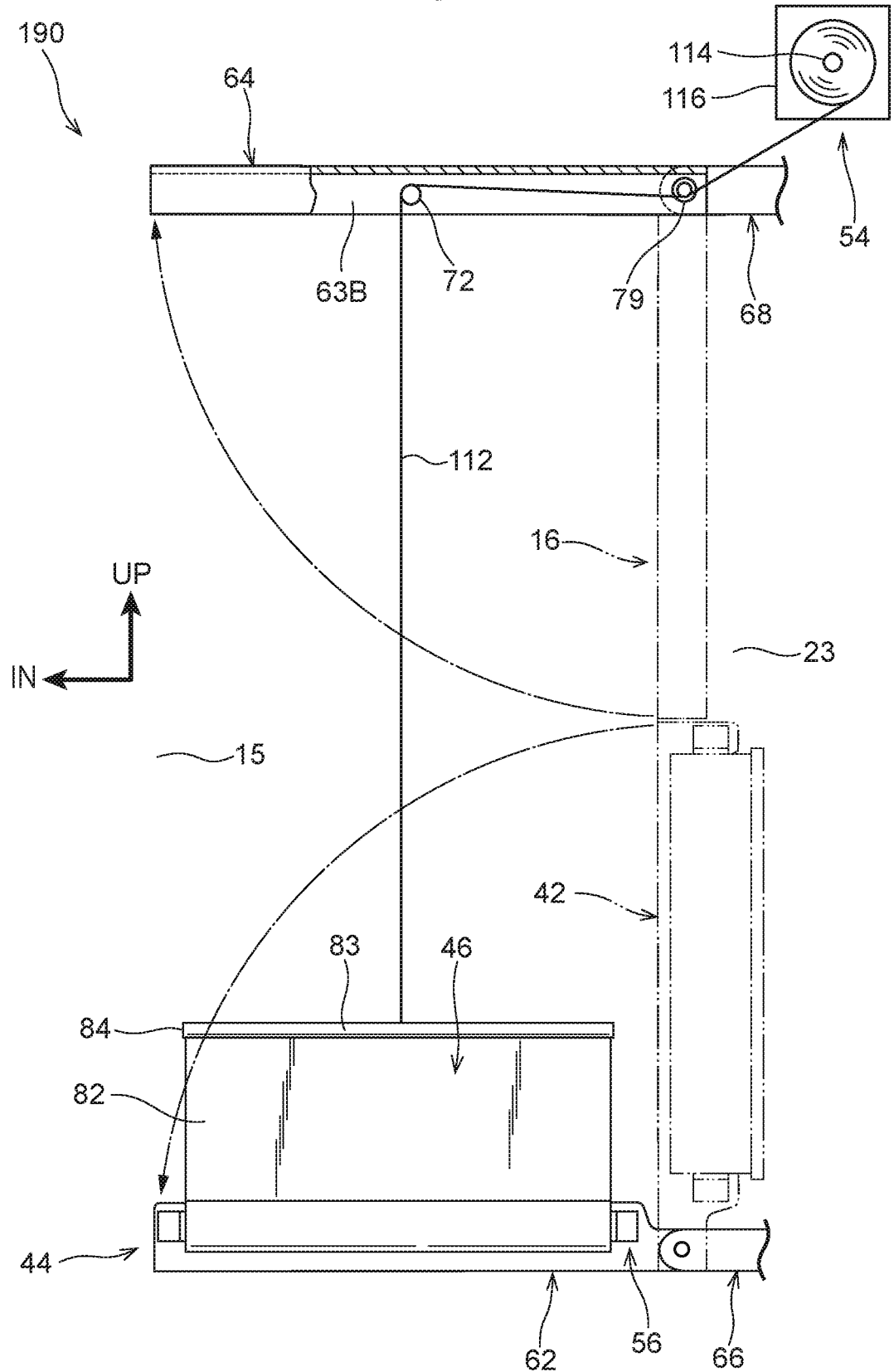
FIG. 22 is a configuration diagram illustrating an interior structure according to a second modified example.

FIG. 22 illustrates an interior structure 190 as a second modified example of the vehicle interior structure. The interior structure 190 is a structure in which the interior structure 40 (see FIG. 4) has been vertically inverted. Namely, the screen member 46 is provided in the first channel member 62, serving as an example of a lower member, when in a non-deployed state. The second channel member 64, serving as art example of an upper member, is disposed at the upper side of the first channel member 62. The pull-out section 54 is configured to pull the screen member 46 from the first channel member 62 toward the second channel member 64.

In the interior structure 190, the second channel member 64 is moved toward the upper side inside the vehicle cabin 15 and the first channel member 62 is moved toward the lower side inside the vehicle cabin 15 so as to expose the screen member 46 inside the vehicle cabin 15 in the non-deployed state. The exposed screen member 46 is deployed from the first channel member 62 toward the second channel member 64 so as to be stretched out between the second channel member 64 and the first channel member 62. The second channel member 64 can be utilized to suppress positional misalignment of part of the screen member 46. This thereby enables swaying of the screen member 46 when in the deployed state to be suppressed.

In the interior structure 190, the pull-out section 54 pulls the screen member 46 from the first channel member 62 toward the second channel member 64, thereby retaining the screen member 46 in a stretched-out state. This thereby enables flexing of the screen member 46 when in the deployed state to be suppressed.

Other Modified Examples

In the interior structure 40, the shaft 86 may be rotatably housed inside the first channel member 62 without providing the opening-closing door 48. Moreover, the drive section 52 does not have to be provided. If the drive section 52 is absent, the occupant PA or the occupant PB may move the first channel member 62 and the second channel member 64 manually. Moreover, the interior structure 40 may be configured such that the screen member 46 is disposed between a non-illustrated front passenger seat and a rear passenger seat of the vehicle 10.

The interior structure 120 may be configured as a structure provided with at least one of the front interior structure 126, the rear interior structure 128, the upper interior structure 172, or the lower interior structure 174. Moreover, the take-up sections 162 do not have to be provided. If the take-up sections 162 are absent, the occupant PA or the occupant PB may move the corresponding channel member 144 manually. Either the partitioning member 176A or the partitioning member 176B may also be omitted.

There is no limitation to a configuration in which the screen member 46, the curtain 146, the partitioning member 176A, and the partitioning member 176B are rolled up, and they may be folded into a concerting shape.

There is no limitation to a configuration in which the pull-out section 54 pulls on a vehicle width direction central portion of the screen member 46, and the pull-out section 54 may pull on a location other than the width direction central portion.

Either the first projector 36 or the second projector 38 may be omitted. In a vehicle in which the first projector 36 and the second projector 38 are absent, the screen member 46 may be employed as a simple partitioning member.

The channel member 44, 144 may be made of metal or made of resin. The moving members are not limited to having U-shaped cross-section profiles as in the channel member 44, 144, and may be tube shaped (square tube shaped, circular tube shaped) members or rod shaped (circular rod shaped, square rod shaped) members.

The front interior structure 126 and the rear interior structure 128 may be configured asymmetrically about the vehicle front-rear direction center inside the vehicle cabin 15. The upper interior structure 172 and the lower interior structure 174 may be configured asymmetrically about the vehicle vertical direction center of the center pillar 16.

Cases in which the curtain 146 of the rear interior structure 128 is employed are not limited to cases in which the front seat 32 and the rear seat 34 are disposed facing each other, and may also be applied in cases in which the front seat 32 faces toward the vehicle front side in a placement for normal driving.

Configuration may be made in which the interior structure 40 is provided on one side of the vehicle width direction center of the vehicle 10, with the interior structure 120 being provided on the other side of the vehicle width direction center.

Although explanation has been given regarding vehicle interior structures according to the respective exemplary embodiments and modified examples of the present disclosure, these exemplary embodiments and modified examples may be employed in appropriate combinations, and various configurations may be obviously be implemented within a range not departing from the spirit of the present disclosure.

What is claimed is:

1. A vehicle interior structure comprising:
a vehicle interior member that is integral with a roof or a pillar, that is formed with an opening facing a vehicle cabin, and that is formed with a hollow housing section on an opposite side to the vehicle cabin;
a moving member capable of being housed in the housing section and capable of moving toward the vehicle cabin through the opening, the moving member including an upper member that is moved from the housing section toward an upper side in the vehicle cabin, and a lower member that is moved from the housing section toward a lower side in the vehicle cabin; and
a curtain member that is provided at one of the upper member or the lower member of the moving member so as to be housed in the housing section when in a non-deployed state, and so as to be at least partially deployed in the vehicle cabin accompanying movement of the moving member into the vehicle cabin or so as to be deployed in the vehicle cabin in a state in which the moving member has been moved into the vehicle cabin.

2. The vehicle interior structure of claim 1, further comprising an opening-closing member that is provided further toward the vehicle cabin side of the housing section than the curtain member and that is capable of opening and closing at least a portion of the opening.

3. The vehicle interior structure of claim 1, further comprising a drive section that drives the moving member toward the housing section and toward the vehicle cabin.

4. The vehicle interior structure of claim 2, further comprising a drive section that drives the moving member toward the housing section and toward the vehicle cabin.

5. The vehicle interior structure of claim 2, further comprising a pull-out section that pulls the curtain member from the one of the upper member or the lower member toward the other of the upper member or the lower member.

6. The vehicle interior structure of claim 3, further comprising a pull-out section that pulls the curtain member from the one of the upper member or the lower member toward the other of the upper member or the lower member.

7. The vehicle interior structure of claim 1, wherein:
the curtain member includes an upper curtain member provided at the upper member and a lower curtain member provided at the lower member.

8. The vehicle interior structure of claim 2, wherein:
the curtain member includes an upper curtain member provided at the upper member and a lower curtain member provided at the lower member.

9. The vehicle interior structure of claim 3, wherein:
the curtain member includes an upper curtain member provided at the upper member and a lower curtain member provided at the lower member.

10. A vehicle interior structure comprising:
a vehicle interior member that is integral with a roof or a pillar, that is formed with an opening facing a vehicle cabin, and that is formed with a hollow housing section on an opposite side to the vehicle cabin;
a moving member capable of being housed in the housing section and capable of moving toward the vehicle cabin through the opening, the moving member including an upper member that is moved from the housing section toward an upper side in the vehicle cabin, and a lower member that is moved from the housing section toward a lower side in the vehicle cabin; and
a curtain member that is provided at the moving member so as to be housed in the housing section when in a non-deployed state, and so as to be at least partially deployed in the vehicle cabin accompanying movement of the moving member into the vehicle cabin or so as to be deployed in the vehicle cabin in a state in which the moving member has been moved into the vehicle cabin, the curtain member includes an upper curtain member provided at the upper member and a lower curtain member provided at the lower member.

11. The vehicle interior structure of claim 10, further comprising a drive section that drives the moving member toward the housing section and toward the vehicle cabin.

12. The vehicle interior structure of claim 10, further comprising a pull-out section that pulls the curtain member from the one of the upper member or the lower member toward the other of the upper member or the lower member.

13. A vehicle interior structure comprising:
a vehicle interior member that is integral with a roof or a pillar, that is formed with an opening facing a vehicle cabin, and that is formed with a hollow housing section on an opposite side to the vehicle cabin;
a moving member capable of being housed in the housing section and capable of moving toward the vehicle cabin through the opening, the moving member including an upper member that is moved from the housing section toward an upper side in the vehicle cabin, and a lower member that is moved from the housing section toward a lower side in the vehicle cabin;
a curtain member that is provided at the moving member so as to be housed in the housing section when in a non-deployed state, and so as to be at least partially deployed in the vehicle cabin accompanying movement of the moving member into the vehicle cabin or so as to be deployed in the vehicle cabin in a state in which the moving member has been moved into the vehicle cabin, the curtain member includes an upper curtain member provided at the upper member and a lower curtain member provided at the lower member;
an opening-closing member that is provided further toward the vehicle cabin side of the housing section than the curtain member and that is capable of opening and closing at least a portion of the opening.

14. The vehicle interior structure of claim 13, further comprising a drive section that drives the moving member toward the housing section and toward the vehicle cabin.

15. The vehicle interior structure of claim 13, further comprising a pull-out section that pulls the curtain member from the one of the upper member or the lower member toward the other of the upper member or the lower member.

* * * * *